(12) United States Patent
Urey et al.

(10) Patent No.: US 10,942,102 B2
(45) Date of Patent: Mar. 9, 2021

(54) SENSING DEVICE USING FIBER BASED CANTILEVERS EMBEDDED IN A CARTRIDGE

(71) Applicant: KOC Universitesi, Istanbul (TR)

(72) Inventors: Hakan Urey, Istanbul (TR); Goksen Goksenin Yaralioglu, Istanbul (TR); Fehmi Civitci, Istanbul (TR); Yusuf Samet Yaras, Istanbul (TR); Gokhan Saglam, Istanbul (TR)

(73) Assignee: TARABiOS SAĞLIK TEKNOLOJİLERİ A.Ş., Istanbul (TR)

( * ) Notice: Subject to any disclaimer, the term of this patent is extended or adjusted under 35 U.S.C. 154(b) by 257 days.

(21) Appl. No.: 15/940,823

(22) Filed: Mar. 29, 2018

(65) Prior Publication Data

US 2018/0217041 A1 Aug. 2, 2018

Related U.S. Application Data

(63) Continuation of application No. PCT/TR2015/050117, filed on Sep. 30, 2015.

(51) Int. Cl.
*G01N 11/02* (2006.01)
*G01N 11/16* (2006.01)
*G01N 9/00* (2006.01)
*G01N 11/10* (2006.01)
*G01N 11/00* (2006.01)

(52) U.S. Cl.
CPC ............ *G01N 11/02* (2013.01); *G01N 9/002* (2013.01); *G01N 11/10* (2013.01); *G01N 11/16* (2013.01); *G01N 2011/008* (2013.01)

(58) Field of Classification Search
None
See application file for complete search history.

(56) References Cited

U.S. PATENT DOCUMENTS

| 5,142,899 A | 9/1992 | Park et al. |
| 9,599,505 B2* | 3/2017 | Lagakos ................ G01H 9/004 |
| 10,502,670 B2* | 12/2019 | Goodbread ............ G01N 9/002 |
| 2009/0255327 A1 | 10/2009 | Jakli et al. |

(Continued)

FOREIGN PATENT DOCUMENTS

WO   WO 2015/033190 A1   3/2015

OTHER PUBLICATIONS

Ju, Py et al., "Microfluidic Flow Meter and Viscometer Utilizing Flow-Induced Vibration on an Optic Fiber Cantilever," Jun. 5, 2011, pp. 1428-1431, T3P.107, IEEE Transducers '11, Beijing, China, Jun. 5-9, 2011.

(Continued)

*Primary Examiner* — Alexander A Mercado
(74) *Attorney, Agent, or Firm* — Brinks Gilson & Lione

(57) ABSTRACT

A sensing device for measuring physical properties of fluid medium uses fiber based cantilevers embedded in a cartridge. The cartridge may include: at least one fluidic channel, at least one light channel, at least one chamber located at the intersection of the fluidic channel and the light channel, and at least one light guide placed in the light channel. The light guide is at least partially contained in the respective chamber. The light guide has a movable section. The vibration of the movable section may be externally actuatable.

40 Claims, 22 Drawing Sheets

(56) References Cited

U.S. PATENT DOCUMENTS

2015/0070000 A1 3/2015 Gao et al.
2018/0052085 A1* 2/2018 Yoshikawa ............ G01N 9/002

OTHER PUBLICATIONS

Lien, V., et al., "Microfluidic flow rate detection based on integrated optical fiber cantilever," dated Jul. 11, 2007, pp. 1352-1356, Lab Chip 2007, vol. 7, The Royal Society of Chemistry.

O. Cakmak, E. Ermek, N. Kilinc, S. Bulut, . Baris, . H. Kavakli, G. G. Yaralioglu and H. Urey, Accepted Manuscript for "Lab on a Chip," Jan. 2014, pp. 1-10, *Lab Chip*, 2014, DOI: 10.1039/C4LC00809J, The Royal Society of Chemistry. Published in *Lab Chip* vol. 15, Oct. 10, 2014 pp. 113-120, XP002758576.

International Search Report and Written Opinion, pp. 1-11, dated Jun. 21, 2016, issued in International Patent Application No. PCT/TR2015/050117, European Patent Office, Rijswijk, The Netherlands.

International Preliminary Report on Patentability, dated Dec. 13, 2017, pp. 1-24, issued in International Patent Application No. PCT/TR2015/050117, European Patent Office, Rijswijk, The Netherlands.

* cited by examiner

SENSING DEVICE USING FIBER BASED CANTILEVERS EMBEDDED IN A CARTRIDGE

CROSS-REFERENCE TO RELATED APPLICATIONS

This application is a continuation of International PCT Application No. PCT/TR2015/050117 filed on Sep. 30, 2015, which is incorporated herein by reference.

TECHNICAL FIELD

The present disclosure relates to a sensing device for measuring physical properties of fluid medium using fiber based cantilevers embedded in a cartridge.

BACKGROUND

Physical properties of a fluid medium are useful for scientific and for technical purposes. Medical diagnosis is a good example: the blood plasma viscosity can be used for the diagnosis of several diseases such as cardiovascular disorders, rheumatoid arthritis, and certain autoimmune diseases. Furthermore, in the oil industry, information regarding the chemical composition, phase diagram, density and viscosity of the fluid is critical to decide in which zones it is economical to dig a particular well and to install the right infrastructure in those zones.

There are several approaches for sensing physical properties of fluid medium, one of which is MEMS (Micro Electro Mechanical System) based devices. MEMS cantilevers are made of electroplated nickel and are actuated remotely by magnetic field using an electromagnet. Cantilevers are placed in a liquid, the dynamics of the vibration (phase and amplitude) are influenced by the viscosity of the liquid and the mass accumulation on the cantilevers. By measuring the vibration phase and/or amplitude, one can detect liquid viscosity and minute amounts of chemicals and substances that may exist in the liquid. However, MEMS cantilevers require light to travel in the fluid medium to reach the cantilever surface and this would generate noise during signal transmission. Moreover, the optical readout of MEMS cantilevers generally need active alignment.

Thus a better sensing method is necessary to overcome the problems in the art.

SUMMARY

A sensing device for measuring physical properties of fluid medium using fiber based cantilevers embedded in a cartridge is disclosed. During the sensing operation of the sensing device, light is carried inside the optical fiber. Therefore the signal to noise ratio of the signal is increased; the alignment for the optical readout may be simpler, and the active alignment is not necessary, so as to achieve a precise sensing effect with a simple sensing method.

The sensing device includes, a cartridge comprising at least one fluidic channel; at least one light channel; a chamber located at the intersection of the fluidic channel and the light channel; and at least one light guide, each of which is at least partially contained in the respective chamber.

The sensing device is for fluidic medium and comprises a light source; a detector; an electromagnet for generating a time-varying magnetic field; a control electronics for processing the output of the detector and creating a sensing signal in response to the physical property of the fluid medium; and the cartridge is removably coupled in the sensing device.

DETAILED DESCRIPTION

Figure 1:
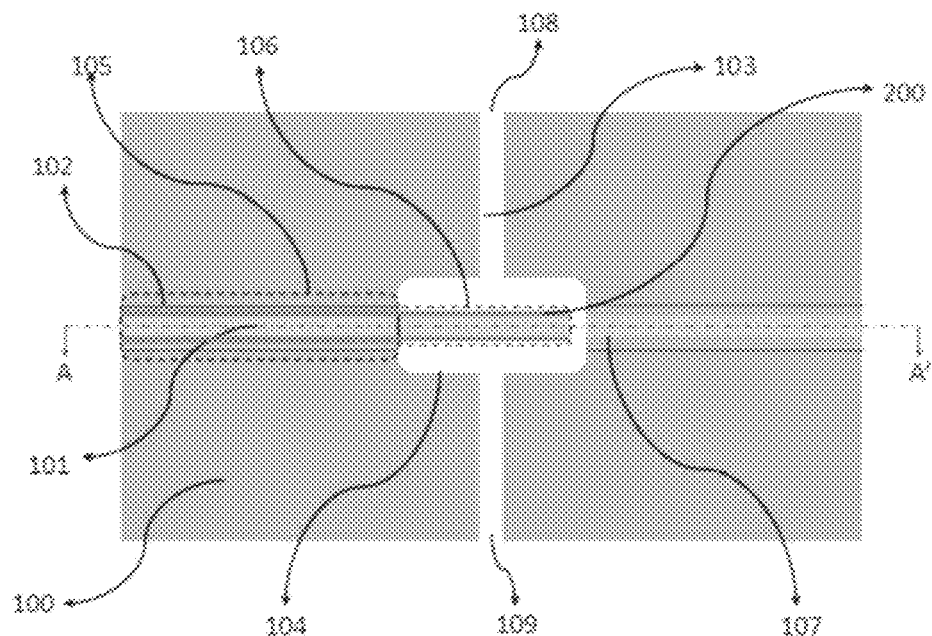
FIG. 1 is a top view of cartridge.
Figure 2:
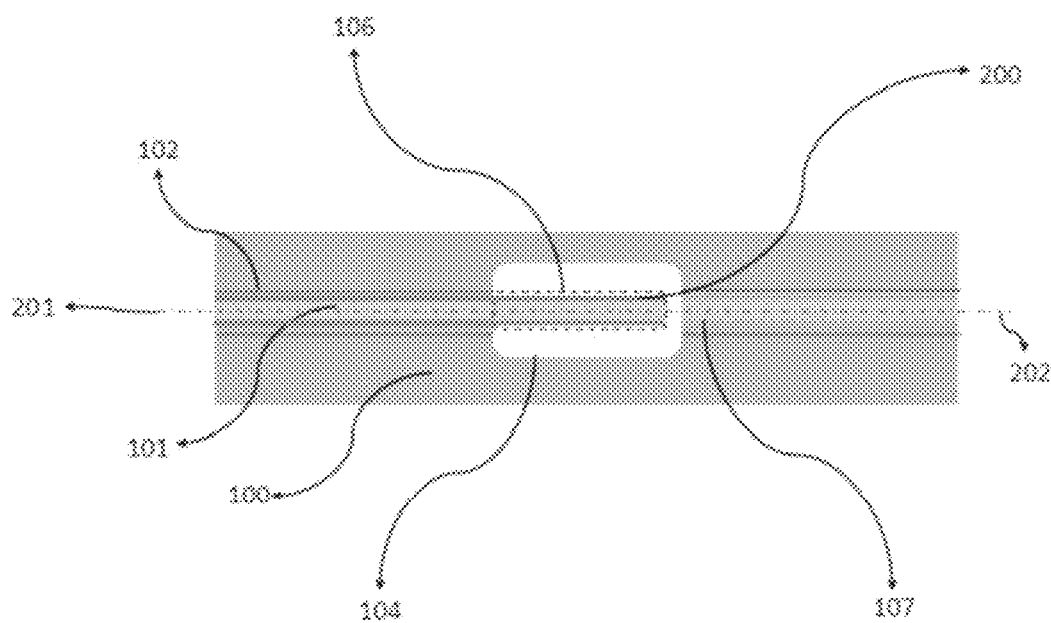
FIG. 2 is a cross section view (from the A-A' line of FIG. 1) of cartridge.

FIG. 1 shows the top view of cartridge 100 and FIG. 2 shows the cross section of cartridge 100. Cartridge 100 contains at least one light guide 101, wherein the center line of light guide 101 is defined as optical axis of light guide 201, and at least one light channel 102, wherein light guide 101 is placed inside light channel 102. In a preferred embodiment, light channel 102 is a V-groove (the shape of light channel 102 is similar to letter "V") and light guide 101 is an optical fiber or a waveguide. However, the shape of light channel 102 can be any shape such that light guide 101 can be placed in light channel 102. Furthermore, cartridge 100 comprises at least one fluidic channel 103. Fluidic channel 103 provides a flow path for a fluid placed into fluidic channel 103. Fluidic channel 103 and light guide 101 intersect with each other. At the intersection of light guide 101 and fluidic channel 103, there exists chamber 104. Viscosity measurement is conducted in chamber 104. Light guide 101 has two sections: fixed section 105 and movable section 106. Movable section 106 can vibrate by using an actuator (not shown in the drawing) that is located outside of cartridge 100. This actuator can be an electromagnet, which is capable of generating a time varying magnetic field. Movable section 106 of light guide 101 is coated with magnetic thin film 200. A time-varying magnetic field can be generated by applying a time varying electric current to the electromagnet. The magnetic field generated by the electromagnet interacts with magnetic thin film 200 coated on movable section 106 that causes movable section 106 to move. The motion direction can be changed for different designs by placing the electromagnet in different locations with respect to movable section 106. Another actuation method can be photo-thermal actuation, which uses a modulated light field focused on to optical absorber 238 on movable section 106 for providing vibration. The photo-thermal actuation method has been described in FIG. 7. Furthermore, piezoelectric or other mechanical actuators can also excite various vibration modes of the movable section 106. Electrostatic actuation requires passivation layers and small gaps and requires electrical connections to cartridge 100. Light guide 101 is coupled to light receiver 107. Light receiver 107 collects light from light guide 101. Different alternatives of light receiver 107 are discussed in the later sections. In one embodiment like biological measurement, cartridge 100 is filled with biological fluids such as plasma, whole blood, saliva or any other fluid that measurement to be taken. Biological fluid enters into chamber 104 through fluid entry port 108. Fluid fills the cartridge using capillary force or can be pushed into cartridge 100 by using a syringe or similar mechanism. Excess air or other fluids already filling the fluid channel exits from chamber 104 via fluid exit port 109.

Figure 3:
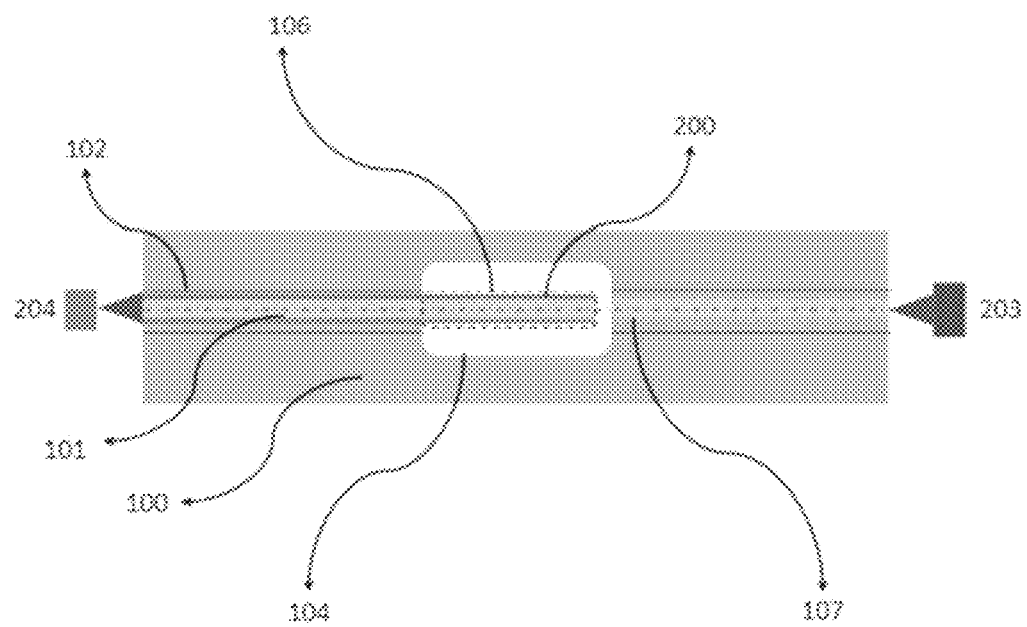
FIG. 3 shows the schematic cross section of cartridge coupled with light source (LD) and photo detector (PD).

FIG. 3 shows light source 204 that is coupled to light guide 101. Likewise, photo detector 203 is coupled to light receiver 107. Light source 204 and photo detector 203 can be integrated into cartridge 100. In a preferred embodiment, light source 204 and photo detector 203 are located outside of cartridge 100.

Figure 4:
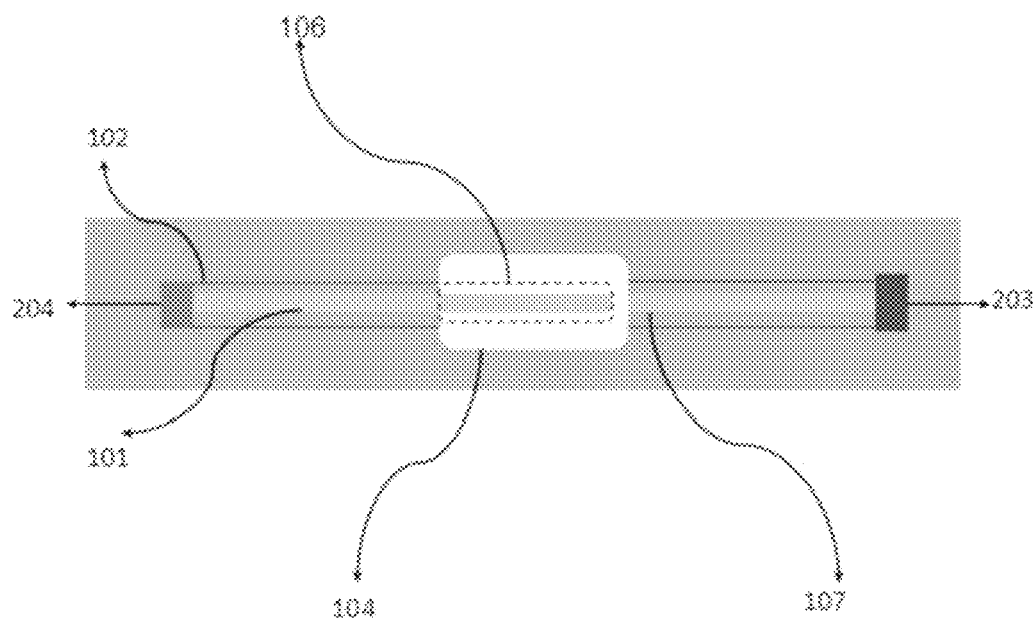
FIG. 4 shows the PD and the LD units are placed into cartridge and directly coupled to light guide and light receiver unit.
Figure 5:
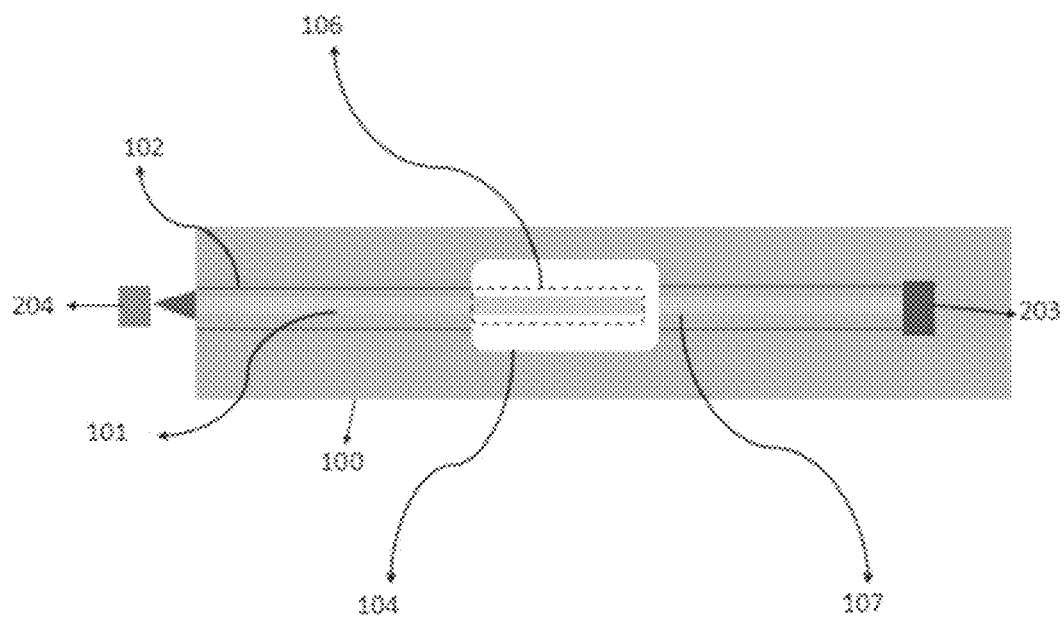
FIG. 5 schematically shows that only PD is integrated inside cartridge.
Figure 6:
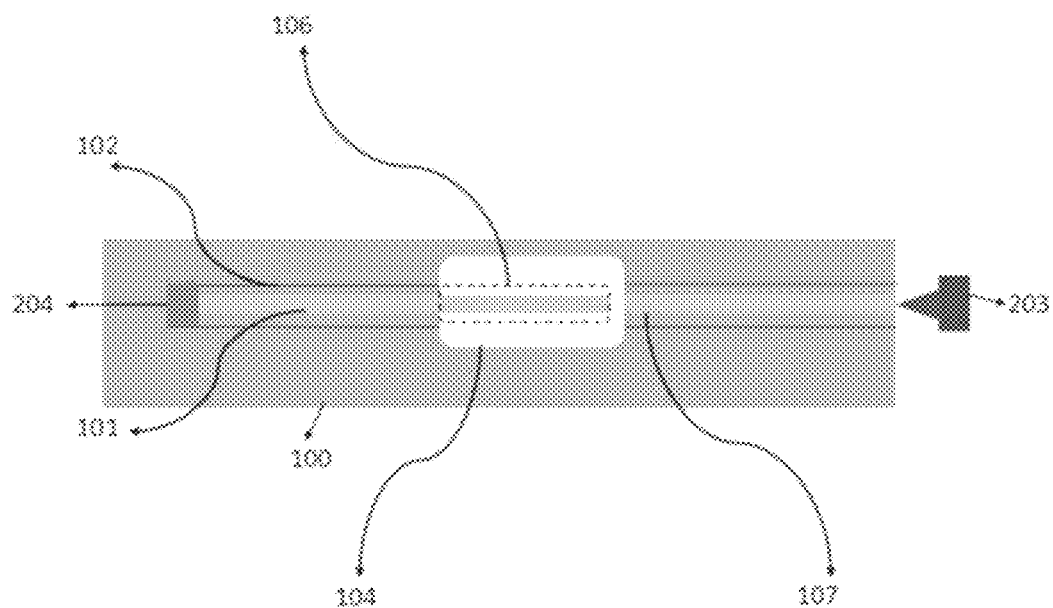
FIG. 6 schematically shows that only LD is integrated inside cartridge.

In another embodiment (FIG. 4), light source 204 and photo detector 203 are all being assembled in cartridge 100 and become part of cartridge 100. Light source 204 and photo detector 203 are coupled to light guide 101 and light receiver 107 correspondingly. In yet another embodiment (FIG. 5), photo detector 203 is integrated into cartridge 100 while light source 204 is located outside of cartridge 100. In yet another embodiment (FIG. 6), light source 204 is integrated into cartridge 100 while photo detector 203 is located outside cartridge 100. Optical alignment of light guide 101 and light receiver 107 is easier when either photo detector 203 or light source 204 is integrated into cartridge 100. Likewise optical alignment of light guide 101 and light receiver 107 is easier when both photo detector 203 and light guide 204 are integrated into cartridge 100.

Figure 7:
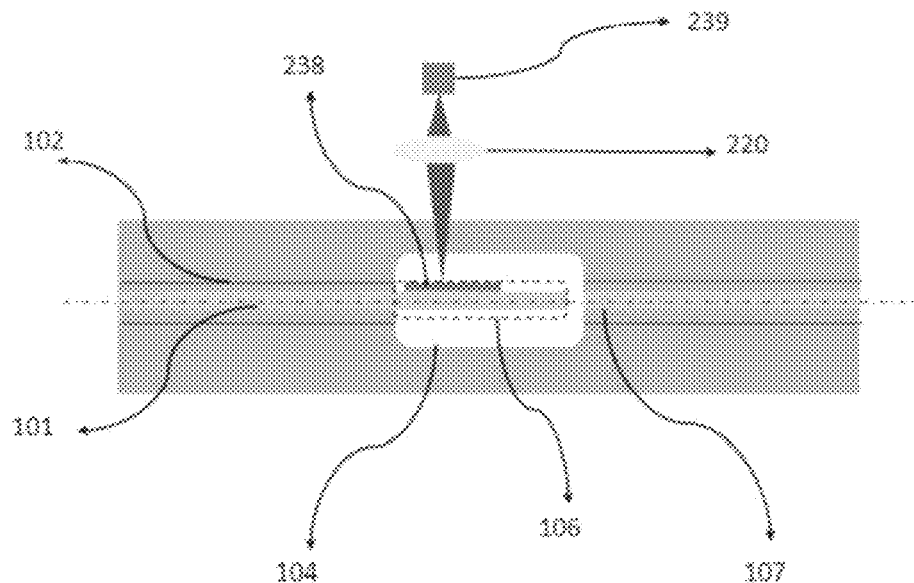
FIG. 7 schematically shows Photo-thermal actuation.

FIG. 7 shows the photo-thermal actuation principle, where optical absorber 238 is illuminated by a light beam that is generated by modulated light source 239. Modulated light source 239 can be a laser light source or can be an LED to generate either visible or infrared (invisible) light. The light generated by modulated light source 239 is modulated and the absorbed light induces sufficient heat and result in bending of movable section 106. Heat is primarily dissipated across light guide 101. The modulation frequency of modulated light source 239 is equal to the desired vibration frequency of light guide 101. Light guide 101 needs to have small thermal mass in order to produce a fast mechanical response to the heat. Lens 220 is located between modulated light source 239 and optical absorber 238. Lens 220 is used to focus the light.

Figure 8:
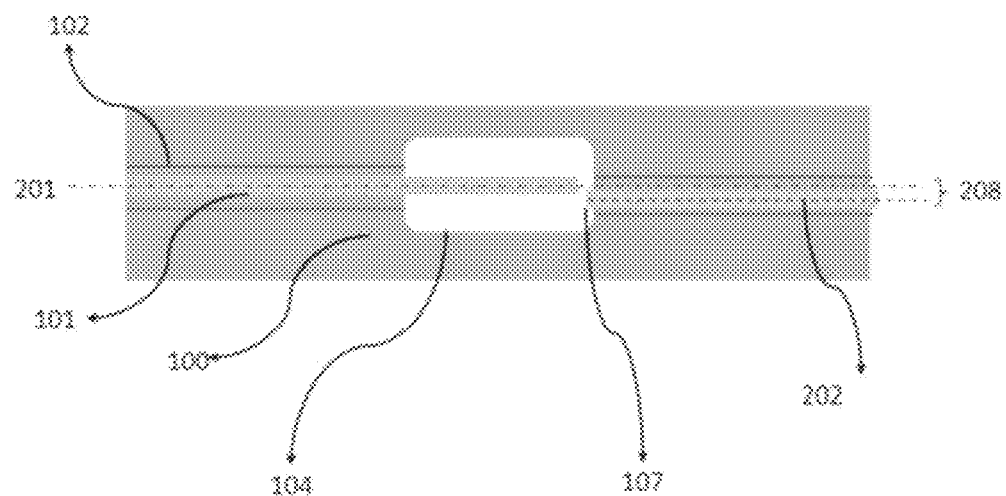
FIG. 8 schematically shows optical axis of light receiver with vertical offset.
Figure 9:
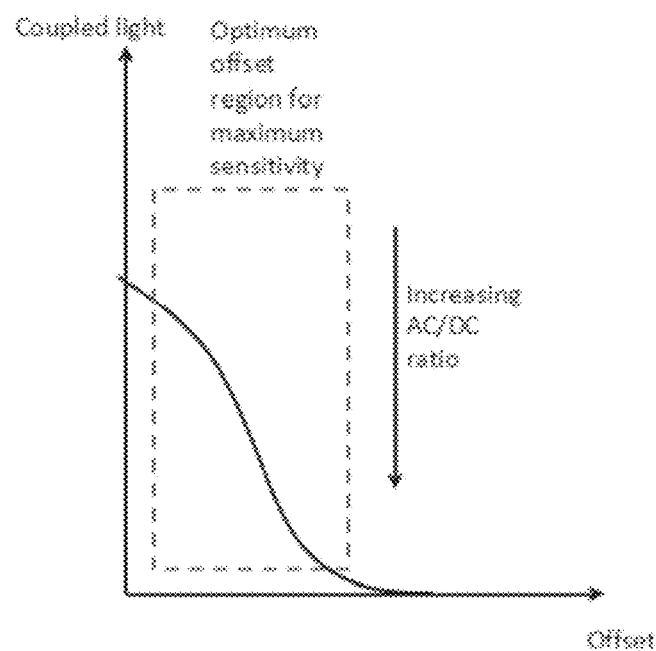
FIG. 9 is a graph showing the relationship between the vertical offset and optical power coupled from light guide to light receiver unit.
Figure 10:
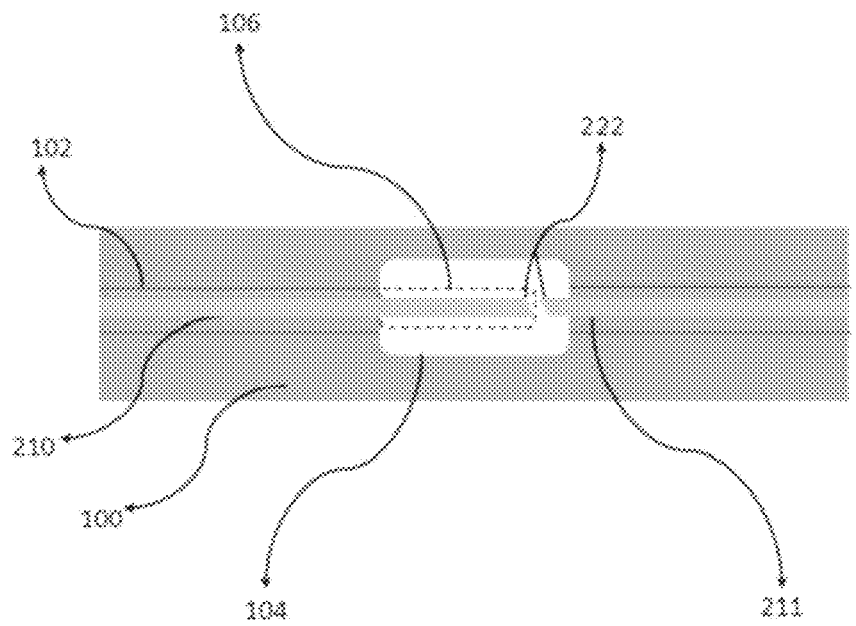
FIG. 10 schematically shows that a special angle cleaved fiber replacing light guide.

Referring to FIG. 8, optical axis of light receiver 202 is placed with vertical offset 208. Optical axis of light receiver 202 is parallel to optical axis of light guide 201. Vertical offset 208 is in a direction parallel to the vibration axis of movable section 106. The DC and the time-varying AC components of the photo detector signal depend on vertical offset 208. FIG. 9 shows the coupled light power from light guide 101 to light receiver 107 as a function of vertical offset 208. In order to get the maximum alternating current (AC) signal (i.e. highest sensitivity), sensing device should be operated in the region with the highest slope, which provides a linear response for the deflection amount (in the order of 100 nm) of light guide 101. For higher AC (alternating current)/DC (direct current) ratio of the signal, vertical offset 208 can be increased further by sacrificing the AC signal amplitude. This helps with better utilization of the dynamic range of the signal. In one embodiment, the amplitude of the AC signal can also be improved by using input fiber 210 in place of light guide 101 and using output fiber 211 in place of light receiver 107 with end facets including a special angle cleaved fiber 222 (As shown in FIG. 10). Considering the refractive indexes (defines the light deflection at the fiber interfaces) and the distance between input fiber 210 and output fiber 211, the cleaving angles can be adjusted to effectively tilt the optical axis of input fiber 210 and output fiber 211. An angular offset thus introduced. This angular offset shown in FIG. 10 and caused by the angle cleaved fiber 222 provides the same effect with vertical offset 208 as shown in FIG. 8.

Figure 11:
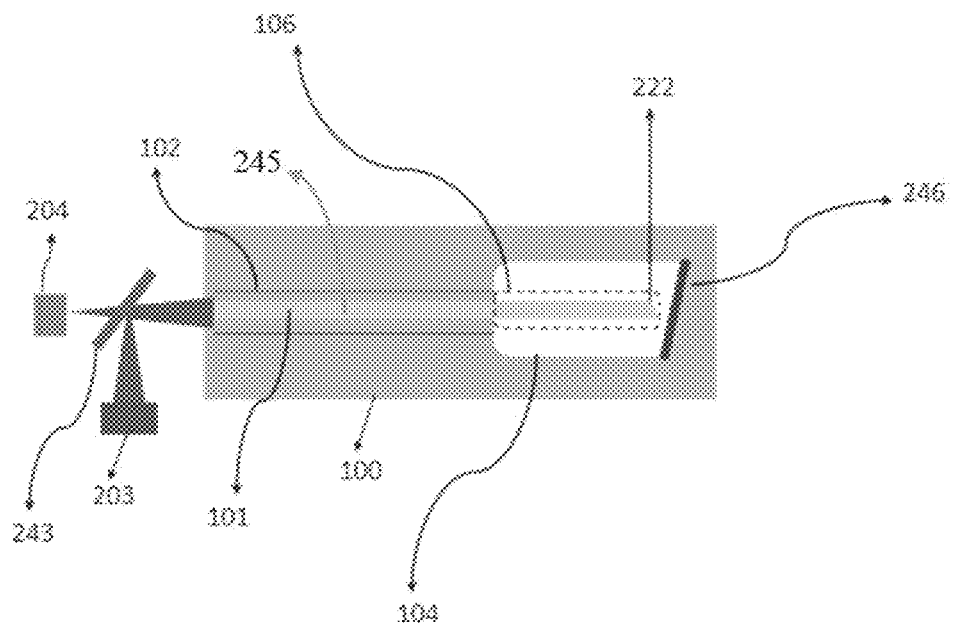
FIG. 11 shows the schematic cross section of sensing device that uses only one special angle cleaved multimode fiber coupled to angled reflector in the chamber.
Figure 12:
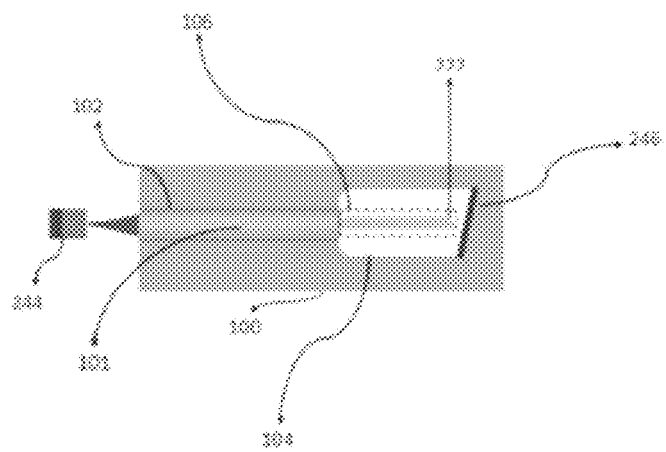
FIG. 12 shows that LD and PD, which are shown in FIG. 3, can be replaced by using a laser diode with an embedded back facet photo-diode.

In another embodiment, FIG. 11 shows the schematic cross section of the sensing device that uses only one light guide 101 coupled to angled reflector 246. Wherein light guide 101 is made of multimode fiber 245. Light is applied to multimode fiber 245 from light source 204. Light travels in multimode fiber 245 and the light is reflected from angled reflector 246. After reflecting from angled reflector 246, the light is coupled back to multimode fiber 245 and travels in multimode fiber 245 until it reaches to beam splitter 243. The light reaches photo detector 203 after being reflected by beam splitter 243. Multimode fiber 245 is vibrated by using one of the techniques mentioned earlier in this application. For example multimode fiber 245 can be coated with a magnetic material and a magnetic field is generated around multimode fiber 245 by using an electromagnet that is located close to multimode fiber 245 and applying current to the electromagnet. While this set up enables multimode fiber 245 to move, there may be different mechanisms to vibrate multimode fiber 245. By vibrating multimode fiber 245 at certain frequency, a sensing signal corresponding to the physical property of the liquid can be obtained. The sensitivity of the system can be maximized by optimizing cleaving of multimode fiber 245 and by adjusting the angle of beam splitter 243 and by adjusting the angle of angled reflector 246. FIG. 12 shows another embodiment wherein a laser diode with an embedded back facet a photo detector 244. Laser diode with a back facet photo detector 244 has the functionalities of photo detector 203 and light source 204.

Figure 13:
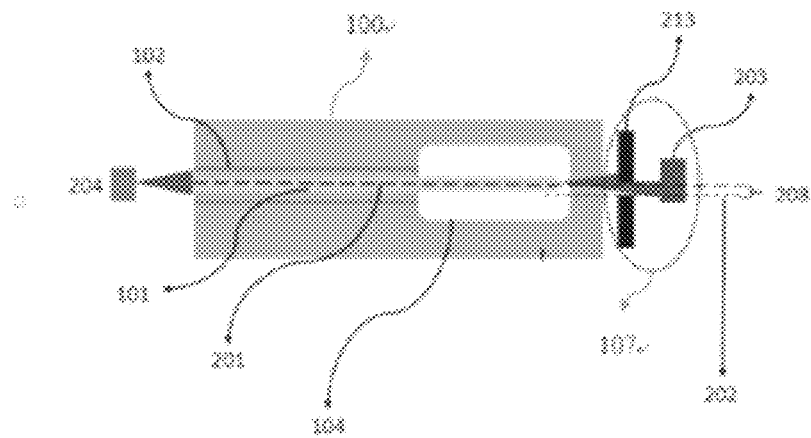
FIG. 13 schematically shows that light receiver unit consists of optical mask and photo detector.
Figure 14:
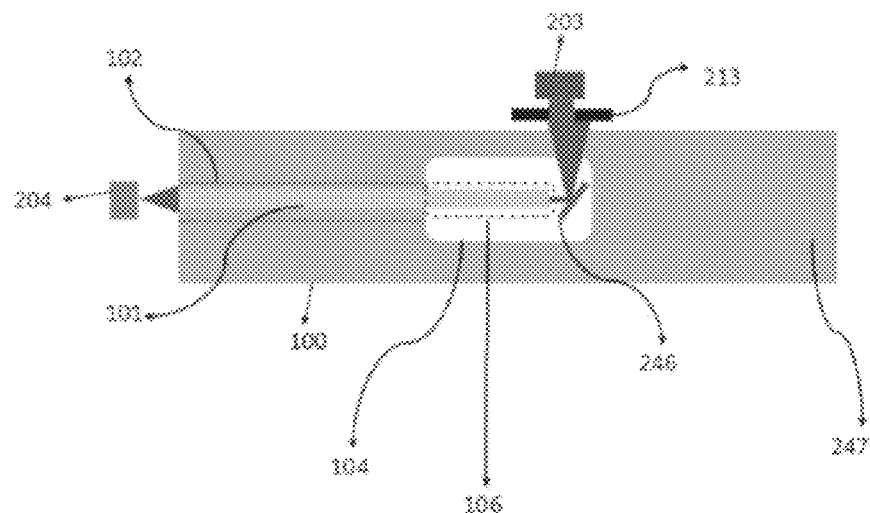
FIG. 14 shows that light coming out of movable section of light guide is turned 90 degrees.

In another embodiment, FIG. 13 shows light receiver 107 includes optical mask 213 and photo detector 203. There exist vertical offset 208 of mask 213 with respect to optical axis of light guide 201. Offset 208 provides a mechanism for the coupled light to be modulated. Cartridge 100 is made of transparent material. Light receiver 107 is placed on top of cartridge 100. Optical mask 213 is located between photo detector 203 and cartridge 100. FIG. 14 shows the light coming out of movable section 106 is reflected by angled reflector 246 and as a result rotated 90 degrees. The light then travels to photo detector 203.

Figure 15:
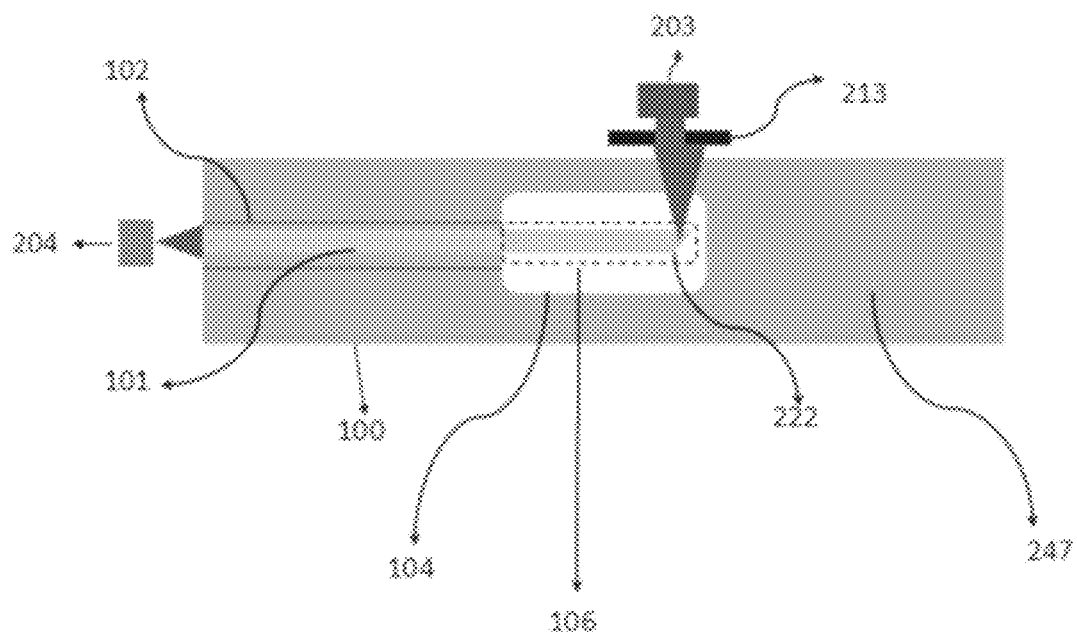
FIG. 15 shows an angle cleaved fiber turning light coming out of movable section of light guide.

FIG. 15 shows another embodiment wherein the light coming out of movable section 106 is reflected and rotated by using angle cleaved fiber 222. This is achieved by total internal reflection from the tip of movable section 106.

Figure 16:
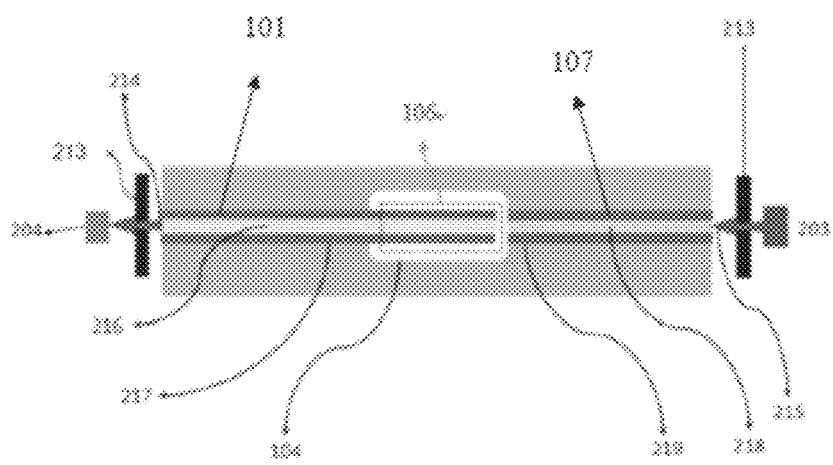
FIG. 16 shows optical mask applied in this device.

FIG. 16 shows another embodiment wherein two optical masks 213 are placed at the cartridge, one optical mask 213 is placed at the entrance of light guide 214 and another optical mask 213 placed at the exit of light receiver 215. This is done in order to prevent cladding mode induced signal reduction. Entrance of light guide 214 includes two layers having different refractive indexes. Light is guided in the inner section (high refractive index) of the light guide by means of total internal reflection. Without optical mask 213, light is coupled to both input fiber core (inner part) 216 and input fiber cladding (outer part) 217 of entrance of light guide 214. Light from light guide 101 will be coupled to output fiber core 218 and output fiber cladding 219 of the light receiver 107. For the movable section 106, the coupled light to the core of receiver side is modulated. Moreover, light to the cladding of the receiver side is also modulated but with a pi phase shift (out of phase) when there is an offset between the exit of light guide 214 and the entrance of light receiver 215. The same situation happens for the light coupled from cladding of movable section 106 to the core/cladding of the receiver side. Since photo detector 203 collects all the light from light receiver 107, the total modulated signal is decreased. With the optical mask 213, both the cladding modes of light guide and the receiver are rejected so that photo detector 103 measures only the modulated light coming from core to core coupling. Optical mask 213 also prevents stray light from light source 204 to photo detector 203 through transparent cartridge material.

Figure 17:
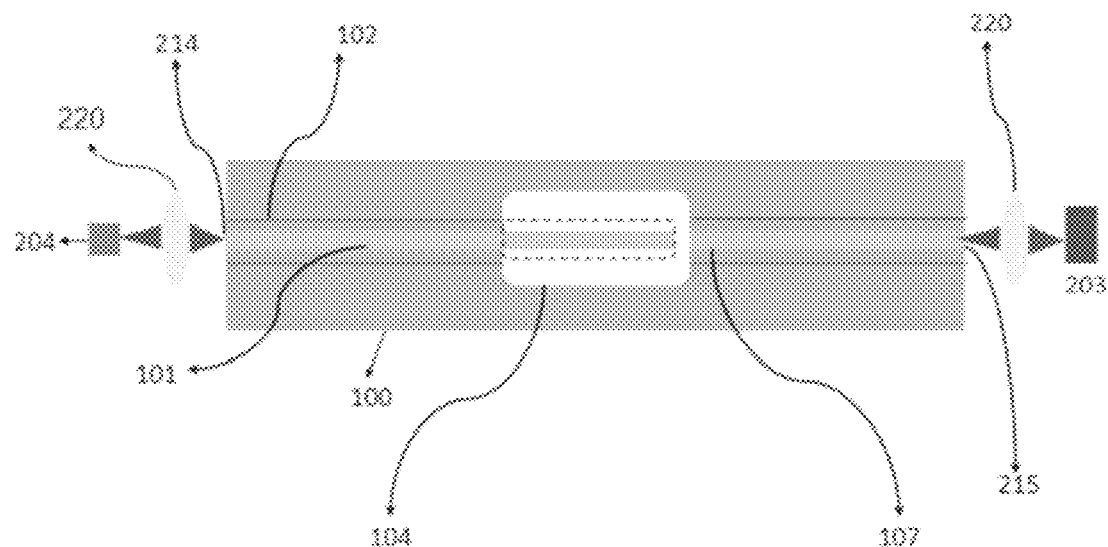
FIG. 17 shows the lenses used for in and out coupling to/from the cartridge.

FIG. 17 shows an embodiment wherein the light from light source 204 to cartridge 100 and light from cartridge 100 to photo detector 203 is coupled via lens 220 which are placed at the entrance of light guide 214 and/or the exit of light receiver 215. Lens 220 at the entrance of light guide 214 will increase the coupled light from light source 204 to the entrance of light guide 214, and with proper focusing most of the light can be contained in the core of the entrance of light guide 214. One of the lens 220 at the exit of light receiver 215 can focus light to a small area, which enables using a very small area of photo detector 203.

Figure 18:
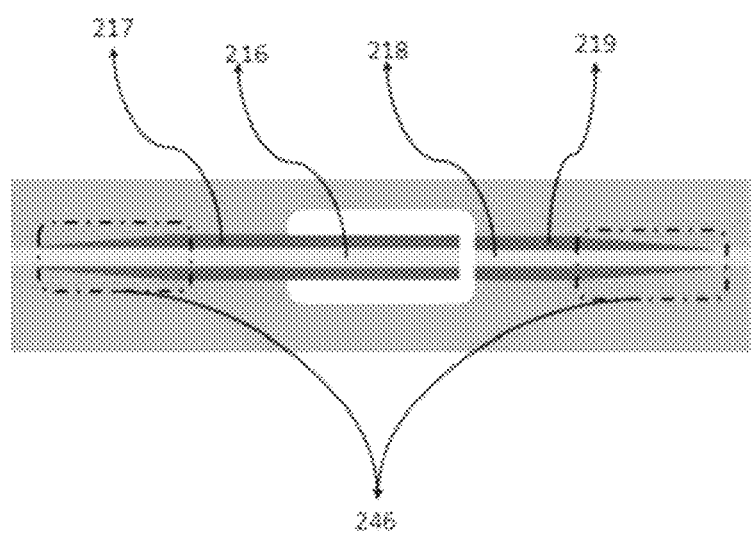
FIG. 18 shows the schematic cross-section of a sensing device that eliminates the cladding modes by using an adiabatically thinned of cladding profile at the input and output port of the cartridge.

As mentioned before, the cladding modes, present in both light guide 101 and light receiver 107, reduce the magnitude of the time varying signal and as a result reduce the signal to bias ratio. FIG. 18 shows another embodiment, in which an adiabatically thinned cladding profile at the input and output port of the cartridge eliminates the cladding mode. Here, the adiabatic profile, which can be achieved by pulling the fiber out of the etchant in a controlled manner, is essential in order not to excite cladding modes from the core of the fiber.

Figure 19:
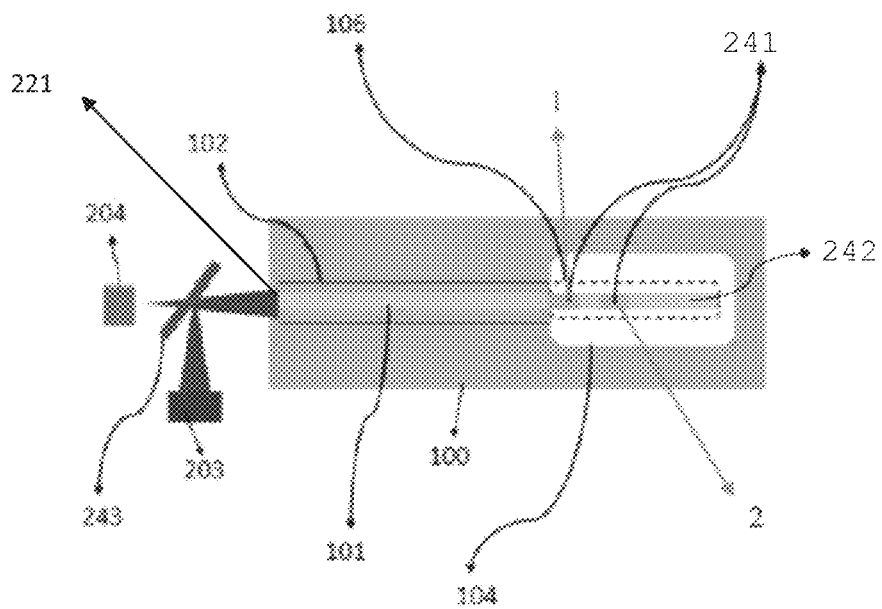
FIG. 19 shows the schematic cross-section of Fiber Bragg Grating (FBG) based sensing device including only one light guide.

In another embodiment, FIG. 19 shows a cross section view of Fiber Bragg Grating (FBG) 241 based sensing device including only one light guide, which is essentially a single mode fiber 242 with embedded Fiber Bragg Grating structure. In this device, light source 204 is coupled to single mode fiber 242 through beam splitter 243, which provides in and out coupling of light from the same fiber facet 221. Fiber Bragg Grating 241 in the single mode fiber 242, which is configured such that it has a certain reflection at the excitation wavelength for fixed fiber condition, reflects the light back to photo detector 203. If Fiber Bragg Grating 241 is placed at the positions 1 (maximum stress region) or position 2 (maximum bending region) as depicted in FIG. 19, the reflected light intensity can be modulated by moving single mode fiber 242. Therefore, a sensing signal with respect to the physical property of the medium can be obtained by vibrating the single mode fiber 242 at a certain frequency. This system has two distinct advantages. One advantage is that AC/DC ratio of the signal can be increased by choosing a low reflection for the fixed fiber condition. Another advantage is that cartridge fabrication complexity is reduced since fluid stop region 223 (as in FIG. 22) is not needed.

Figure 20:
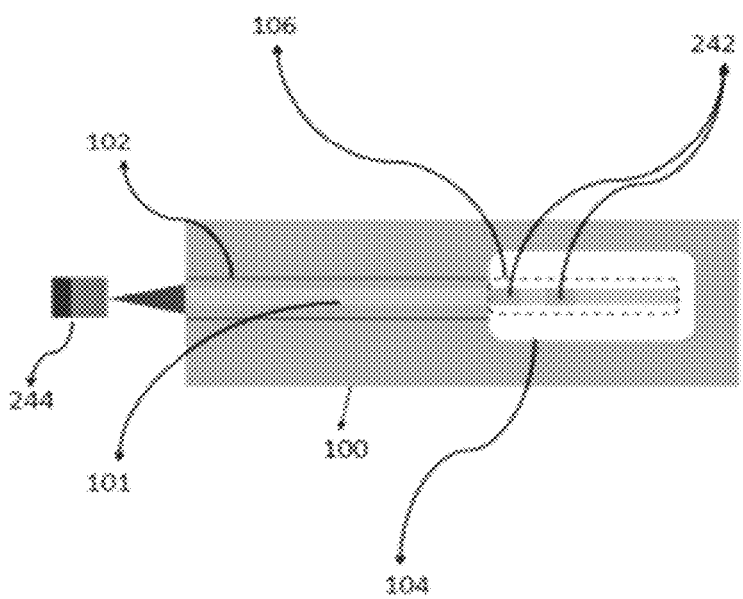
FIG. 20 shows that a butt coupled laser diode with a back facet photo-detector used as a light source.

In another embodiment, FIG. 20 shows a setup in order to reduce the complexity of in and out coupling scheme intrinsic to single mode fiber 242. A butt coupled to laser diode with back facet photo-detector 244 can be used as a light source. The back reflected intensity can be obtained from laser diode with back facet photo-detector 244.

Figure 21:
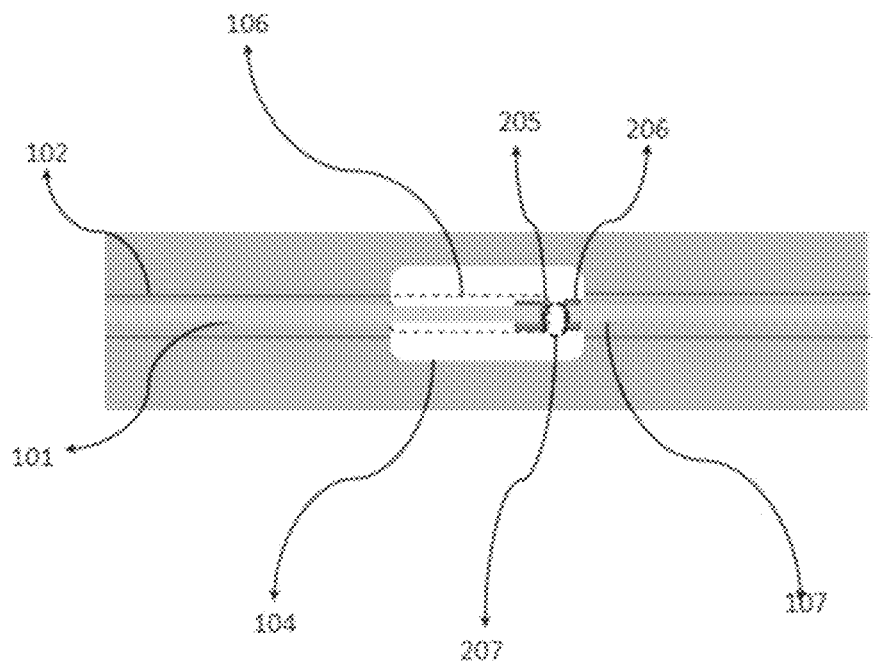
FIG. 21 schematically shows that hydrophobic surface coating can prevent the leakage of fluid between light receiver and light guide.

FIG. 21 shows a cartridge 100, where gap 207 is located between hydrophobic coated light guide section 205 and hydrophobic coated light receiver section 206. If fluid fills gap 207, particles in the fluid, such as the red blood cells in whole blood, cause light to be scattered and absorbed in gap 207. The scattering and absorption introduce noise to the photo detector signal. In a preferred embodiment (FIG. 17), the tip of hydrophobic coated light receiver section 206 and the tip of hydrophobic coated light guide section 205 are coated with hydrophobic surface coating to prevent the leakage of blood (fluid) between the light receiver 107 and the light guide 101.

Figure 22:
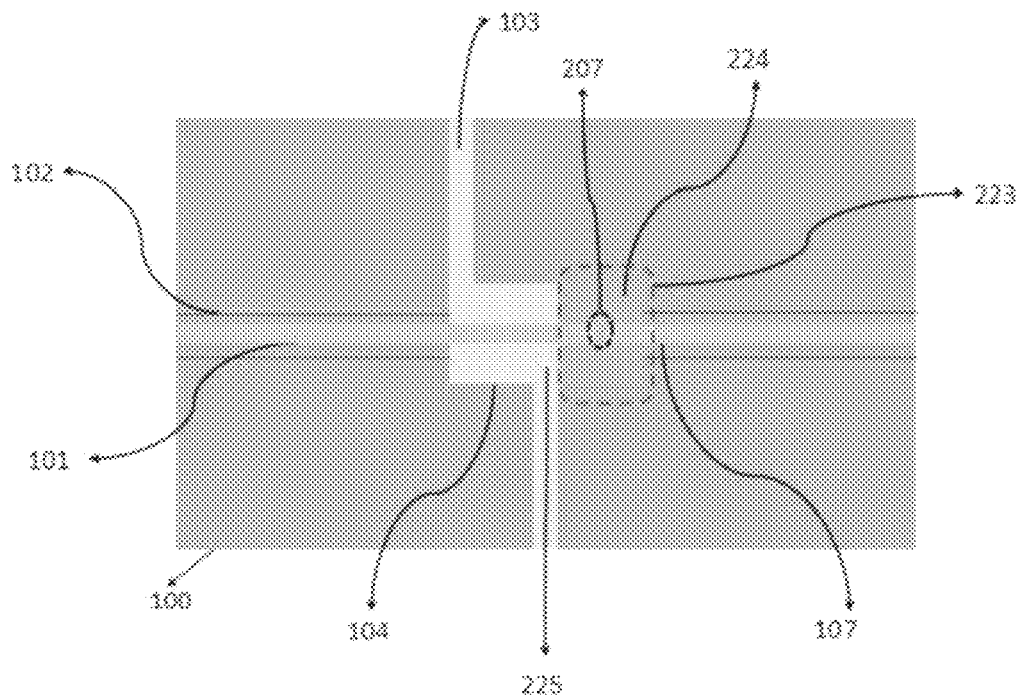
FIG. 22 schematically shows that hydrophobic coating is used in fluid stop region.

Presence of fluid in gap 207 results in scattering and absorption and increases the noise at the same time. In FIG. 22, fluid stop region 223, which surrounds gap 207, is coated with hydrophobic coating 224 and all other fluidic channels 103 and chamber 104 are coated with hydrophilic coating 225. Hydrophilic coating 224 helps the spreading out of the fluid whereas hydrophobic coating 224 will try to prevent the spreading of fluid. Fluid will remain in the hydrophilic coated part so that there won't be any fluid inside the fluid-stop region 223.

Figure 23:
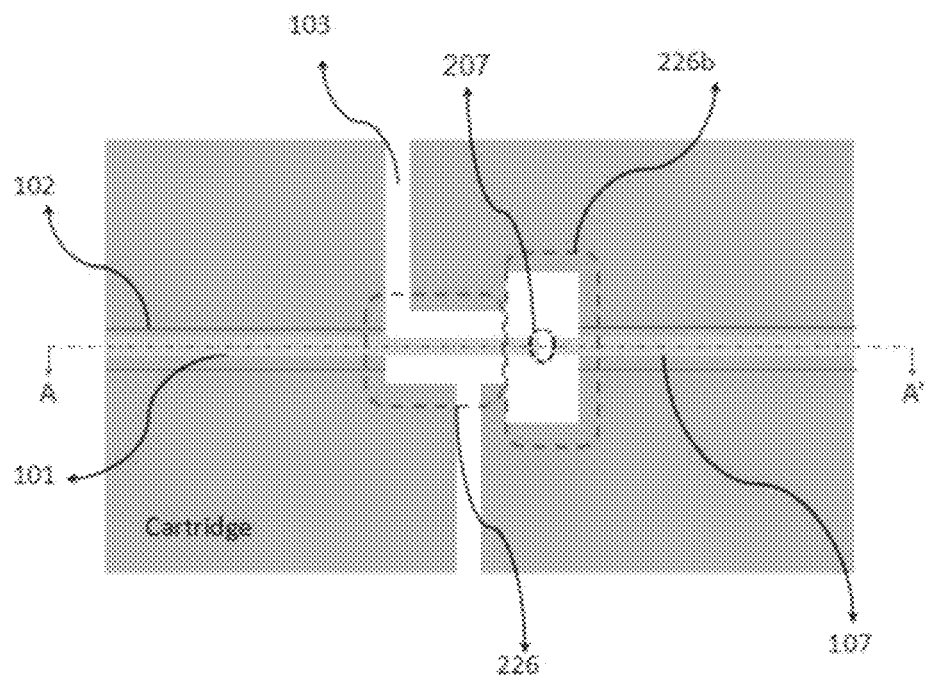
FIG. 23 schematically shows a wide section of chamber.
Figure 24:
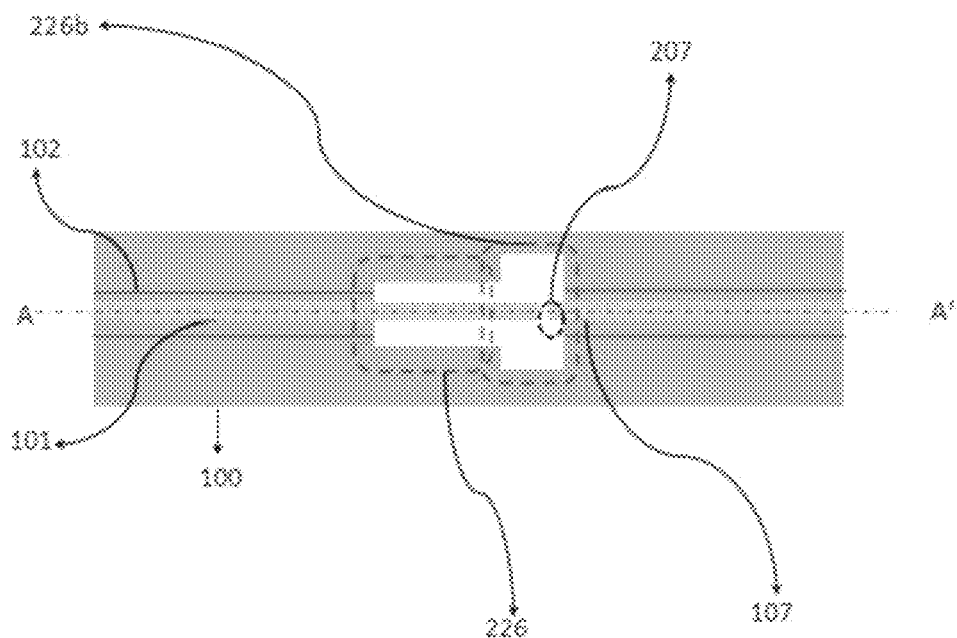
FIG. 24 shows cross sectional view from A-A' of FIG. 23.

In FIGS. 23-24, wide section of chamber 226b is made significantly large so that the fluid will not spread to the wide section of chamber 226b due to the higher capillary force in the smaller section (reduced gaps between the parts) of narrow section of chamber 226.

Figure 25:
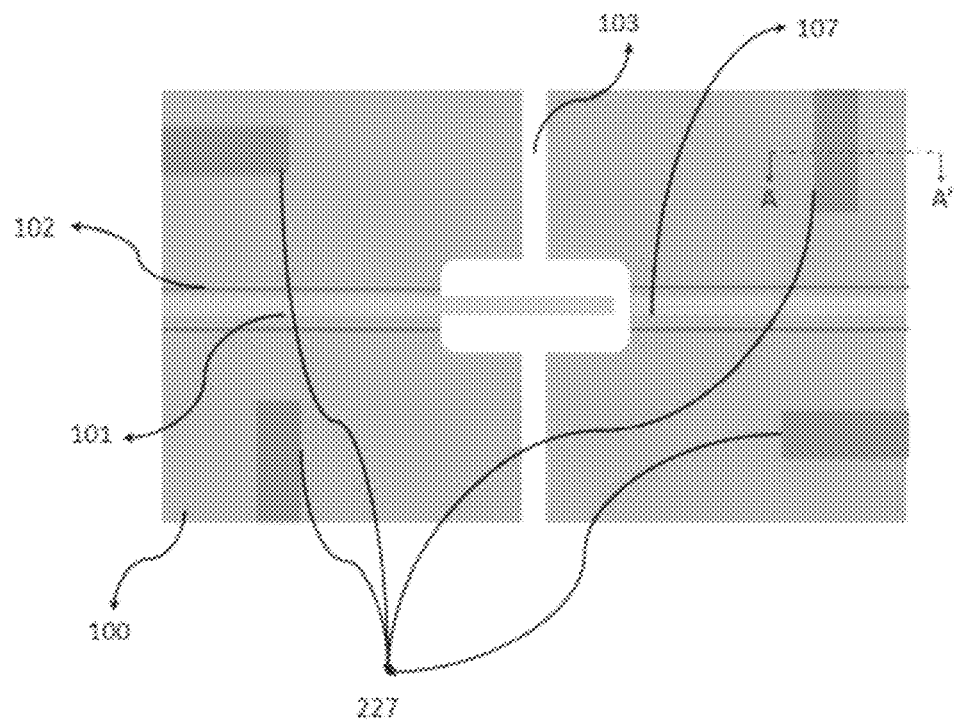
FIGS. 25-26 show the alignment unit of this device.
Figure 26:
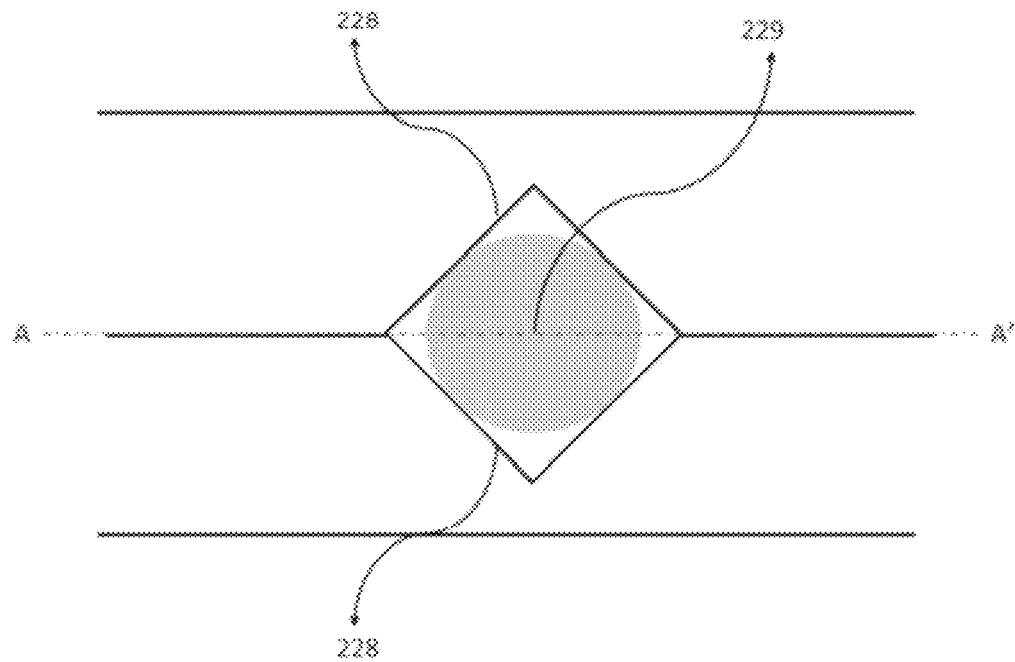

Alignment units 227 (as shown in FIG. 25) are needed to align different layers of cartridge 100 to assure that fluid channel 103, light channel 102 and chamber 104 function properly. FIG. 26 shows cross section of alignment units 227 along A-A' in FIG. 25, which consists of two V grooves 228 on the layers to be aligned using one cylindrical part 229. Cylindrical part 229 is an optical fiber in the preferred embodiment. There needs to be at least two alignment units 227 having perpendicular orientation with respect to each other to assure alignment on the two axes. Placement of cylindrical part 229 with respect to V grooves 228 can be seen in FIG. 26.

Figure 27:
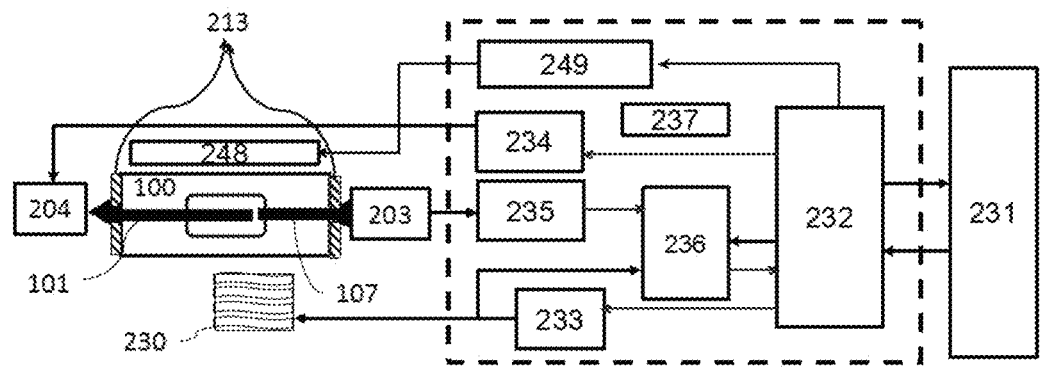
FIG. 27 shows the schematic of overall system.

FIG. 27 shows the schematic of the overall system. Cartridge 100 is shown from a cross section. Light guide 101 is actuated by external magnetic field produced by electromagnet 230. Light source 204 and photo detector 203 are coupled to the light guide 101 and light receiver 107 respectively through optical mask 213. User can interact with this device by using user interface 231. Processor 232 sends signals to the electromagnet driver 233, light source controller 234, photo detector readout 235 and lock in amplifier 236. Electromagnet driver 233 drives electromagnet 230 at desired current and frequency. Light source controller 234 drives light source 204 and photo detector read out 235 converts the current coming from photo detector 203 to an appropriate voltage. Lock-in amplifier 236 locks the signal from photo detector readout 235 to signal from electromagnet driver 233 and traces the phase between them. Power supply 237 supplies electricity to the system. Temperature controller 249 controls heater 248 to ensure a stable temperature for viscosity measurements. It is important to have a controlled temperature for viscosity measurements because viscosity highly depends on temperature.

Figure 28:
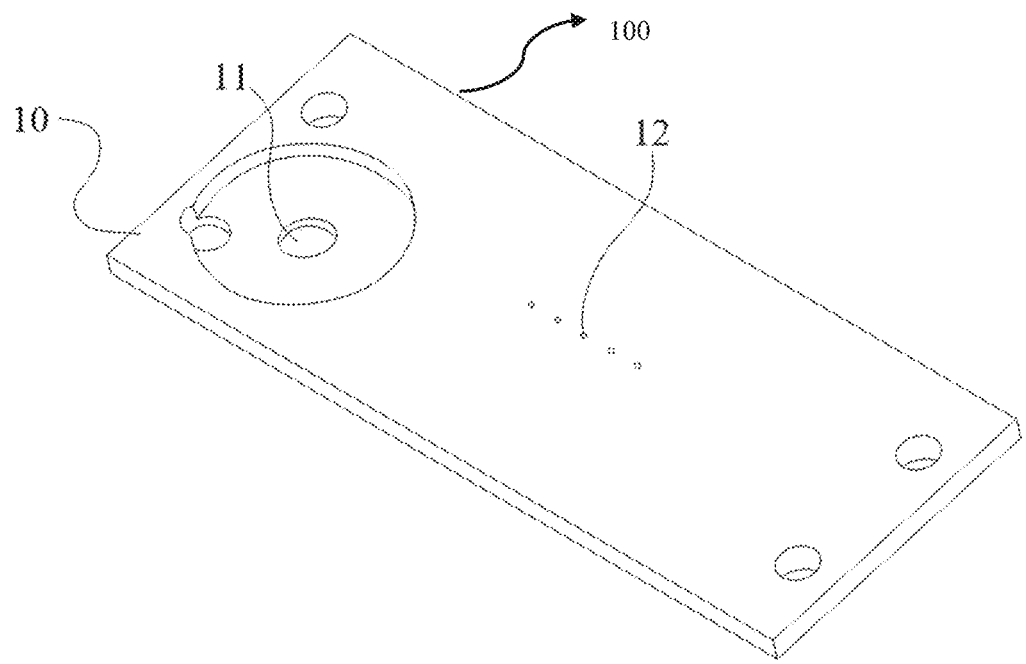
FIGS. 28-29 show a general view of cartridge.
Figure 29:
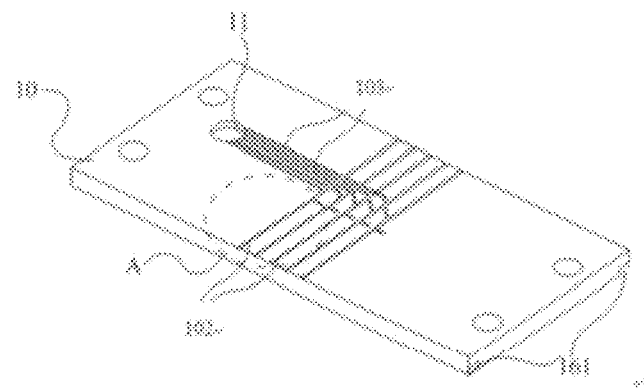

FIGS. 28-29 show another embodiment, cartridge 100, two plates 10 are laminated together to form the main body of cartridge 100. The main body comprises one inlet 11 and five outlets 12. Inside the main body, cartridge 100 further comprises a plurality of light channels 102 and a plurality of fluidic channels 103. In this embodiment, there are five light channels 102, which are disposed along the widthwise direction of plate 10. Light channels 102 contain the respective light guide 101. Each light guide 101 is made of a material that is proper to carry light signal from its input to its output. An example of a light guide is an optical fiber line. Light guide 101 can be stationary. Alternatively light guide 101 is capable of moving within light channels 102. There are five fluidic channels 103 disposed on the surface of one of the plates 10, each of which communicates between inlet 11 and outlet 12. Away from inlet 11, each of fluidic channel 103 intersects with a respective light channel 102. Light channel 102 partly coincides with fluidic channels 103 to form a reaction space 13. Reaction space 13 may contain light guide 101. Light guide 101 can be completely or partially contained by reaction space 13. The shape of light channels 102 can be v-shape, circular shape, triangular shape or any other shape that is proper to carry light guide 101 in light channels 102. Fluidic channels 103 can be in any shape to carry a fluid that is placed in it. The shape of fluidic channels 103 can be v-shape, circular shape, triangular shape or any other shape that is proper to carry the fluid placed in it.

Cartridge 100 further comprises alignment unit 227. Alignment unit 227 comprises two edge reliefs 161 for the cartridge insertion and guidance, which are respectively disposed on two opposite sides of cartridge 100 and configured as arced or step-shape.

Figure 30:
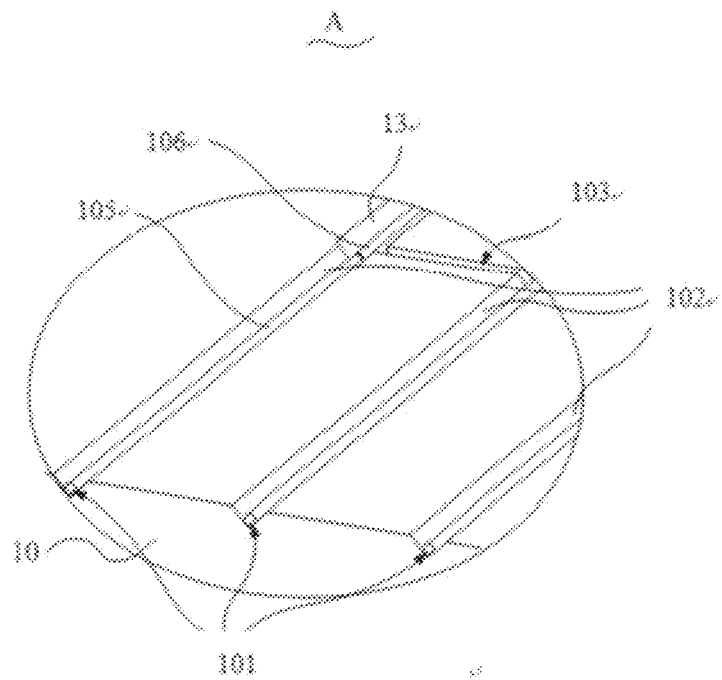
FIG. 30 illustrates an enlarged view of dash circle A of FIG. 1.
Figure 31:
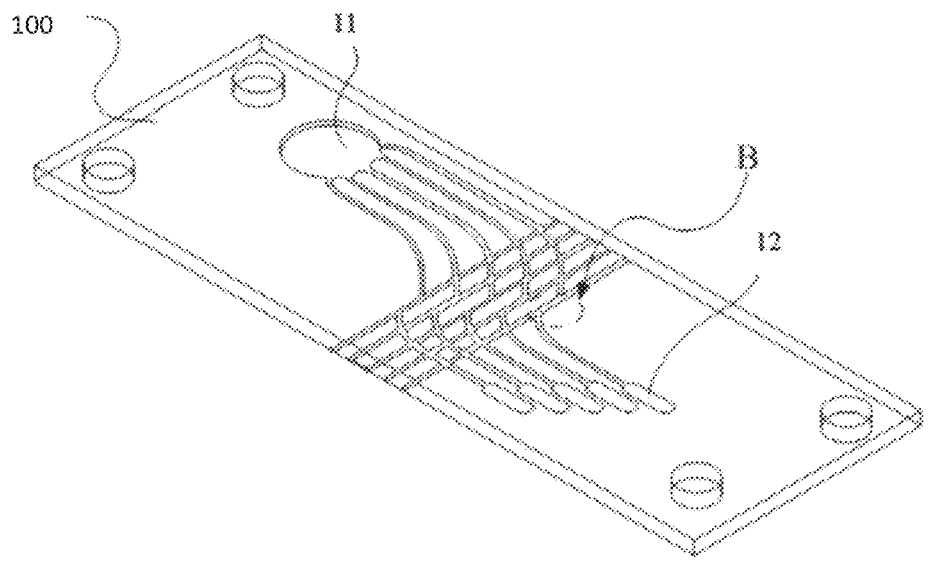
FIGS. 31-32 show a general view of another cartridge in the second embodiment.
Figure 32:
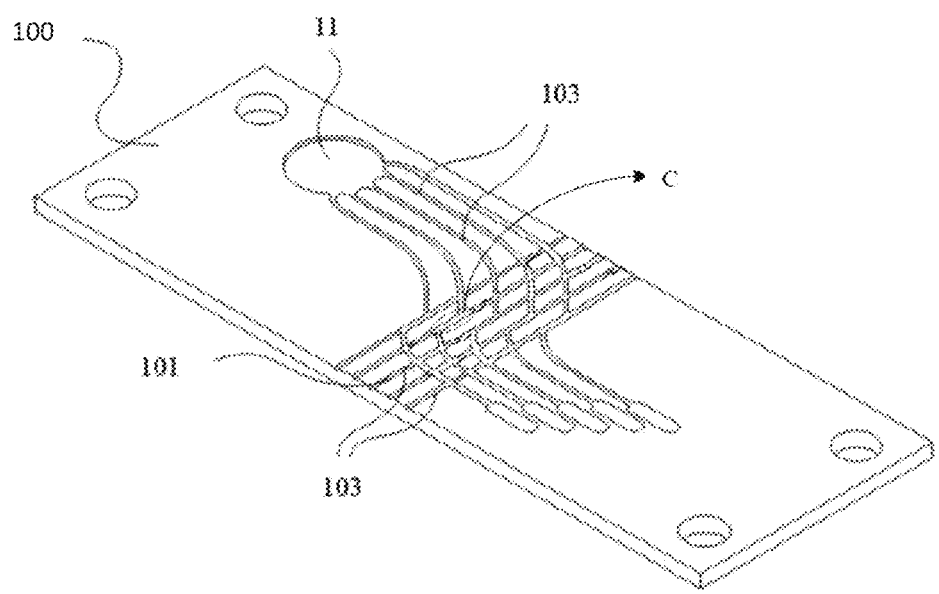
Figure 33:
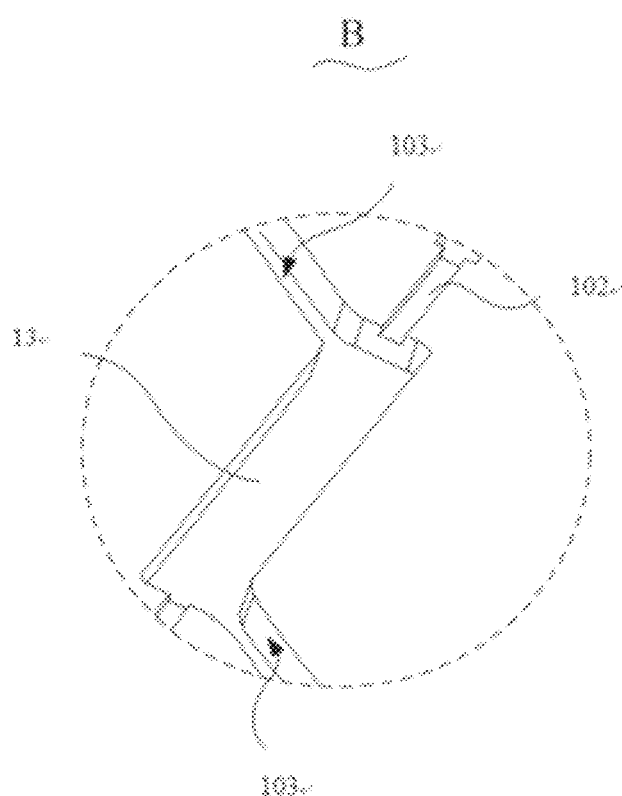
FIG. 33 illustrates an enlarged view of dash circle B of FIG. 31.

FIG. 30 illustrates an enlarged view of dashed circle A of FIG. 29, which shows the distance between the adjacent light guide 101 is about 20 micrometers. Each of light guide 101 comprises fixed section 105 of light guide 101 and movable section 106 of light guide 101. Fixed section 105 of light guide 101 and movable section 106 of light guide 101 are separated by a gap 207 and they are all contained in light guide 101. Gap 207 is less than 10 micrometers. Light guide 101 is selected from materials of optical fiber, waveguide or light pipe, and is coated with magnetic material for magnetic actuation. When light guide 101 is made of materials like optical fiber and light pipe, it may be nickel coated, and the thickness of the coating can be about up to 5 micrometers and preferably between about 1 micrometer and about 2 micrometers. Light guide 101 can be stationary or mechanically moving component.

In alternative embodiments, light channels 102 and fluidic channels 103 may not intersect. Instead, different means to transfer fluid from fluidic channels 103 to light channels 102 can be used. These means include very small channels formed between fluidic channels 103 and light channels 102. The main objective is to carry the fluid medium from inlet 11 to light channels 102 such that light guide 101 within light channels 102 can be in contact with the fluid medium applied to inlet 11. In another embodiment there may not be a reaction space 13. The shape of light channel 102 can be v-shape, circular shape, triangular shape or any other shape that is proper to carry light guide 101 in light channels 102. Fluidic channels 103 can be in any shape to carry a fluid medium that is placed in it. The shape of fluidic channels 103 can be v-shape, circular shape, triangular shape or any other shape that is proper to carry the fluid medium placed in it.

Figure 34:
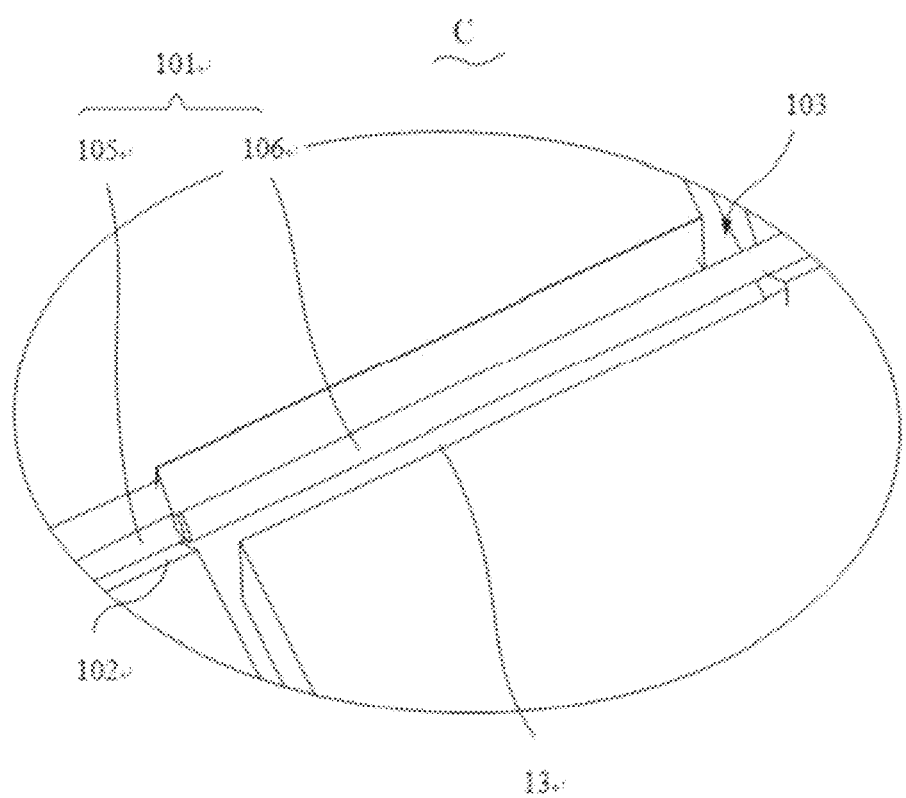
FIG. 34 illustrates an enlarged view of dash circle C of FIG. 32.

FIGS. 31-34 disclose another cartridge 100 of another embodiment. In this embodiment, cartridge 100 has one inlet 11 and five outlets 12. There are five reaction spaces 13, each of which is formed on the coinciding position of fluidic channel 103 and light channel 102. Reaction space 13 is rectangular, which has a depth of no more than about 25 micrometers and offsets half of the diameter of light guide 101. Reaction space 13 has a deeper depth and larger area comparing with the main body of fluidic channel 103. FIG. 34 illustrates an enlarged view of dashed circle C of FIG. 32, which clearly shows two parts of light guide 101, namely, fixed section 105 of light guide 101 and movable section 106 of light guide 101. The tip of the movable section 106 of light guide 101 has a hydrophobic coating. The description of FIGS. 31-34 are also adaptable to the cartridges of other embodiments.

The main difference between this embodiment and other embodiments is that fluidic channels 103 and light channels 102 are formed on the opposite surfaces of two plates. Light channels 102 are v-shape in cross-section in the first embodiment, and light channels 102 in the second embodiment may be square or rhombus in cross-section. Therefore, light guide 101 may move more freely and oscillate deeper in light channels 102 as the area of cross-section is enlarged.

Figure 35:
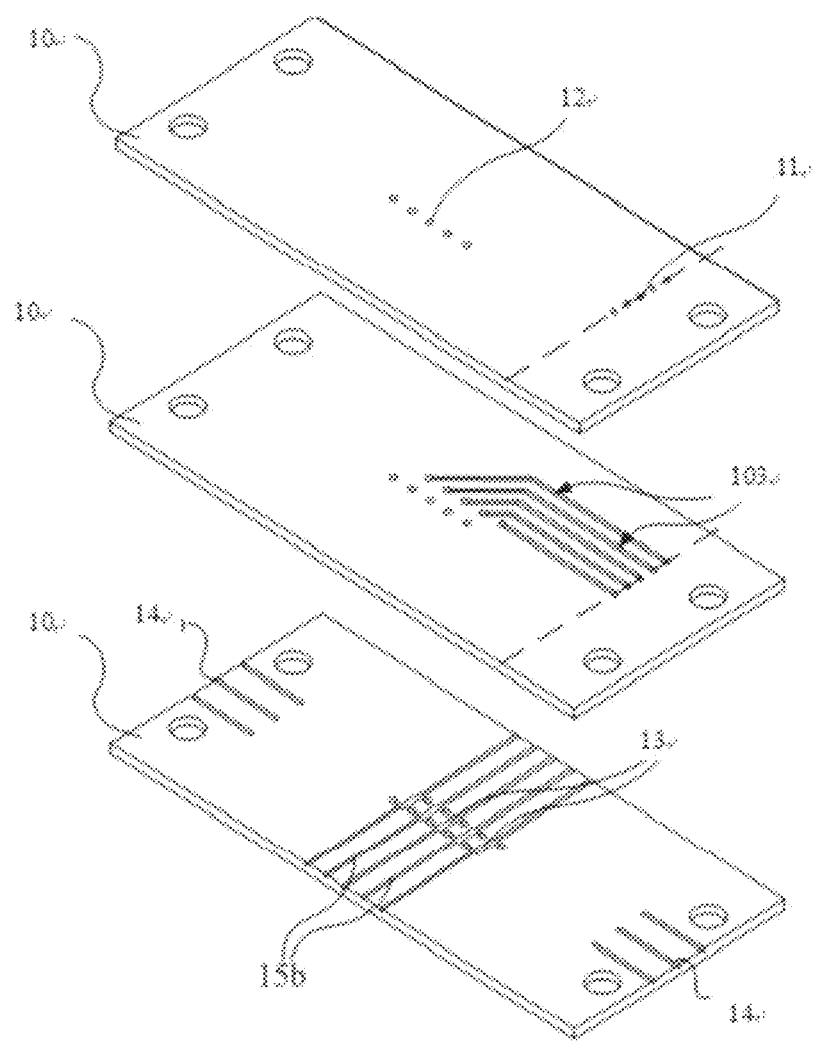
FIG. 35 schematically illustrates another cartridge of a third embodiment.

FIG. 35 schematically illustrates another cartridge of a third embodiment. The main differences between the embodiments are that: the cartridge comprises five inlets 11; the main body of the cartridge is formed by three plates 10; the alignment unit 227 of the cartridge further comprises a plurality of grooves 14. Light channels 102 and grooves 14 are formed on the same plate 10. Grooves 14 are disposed along the lengthwise direction of plate 10, which is perpendicular to light channels 102. With grooves 14, the lateral alignment of plates 10 may be simpler.

Figure 36:
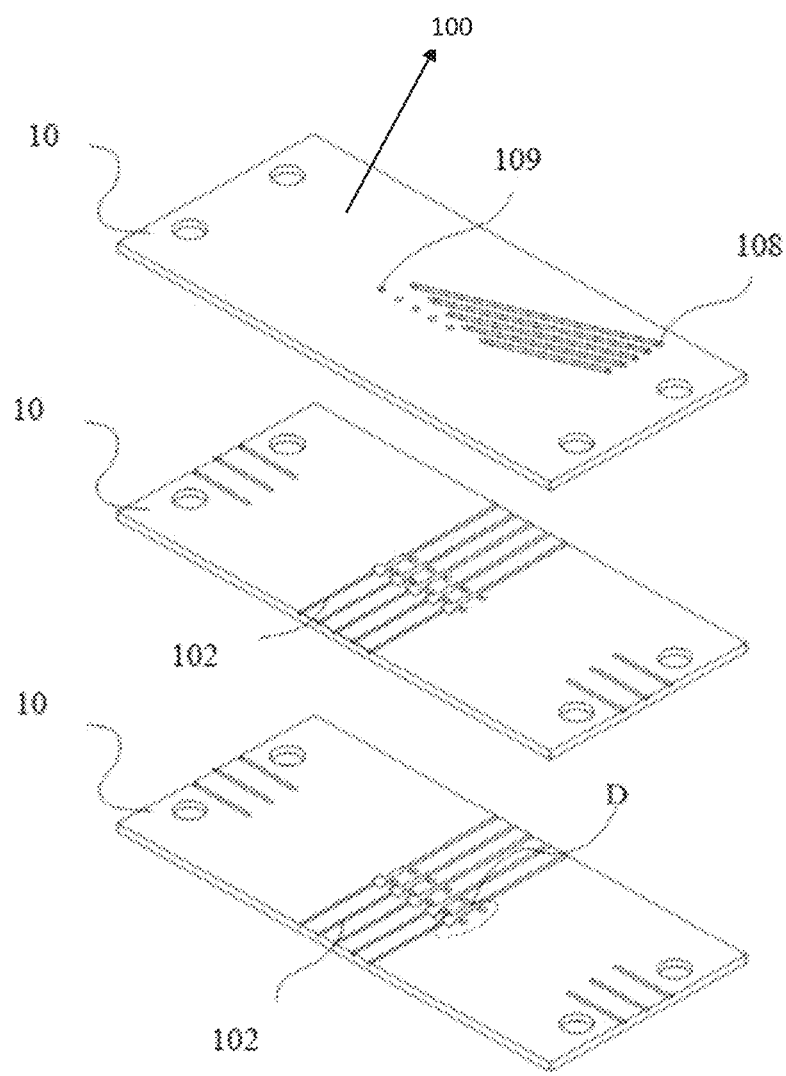
FIG. 36 illustrates the different layers of the preferred cartridge embodiment.
Figure 37:
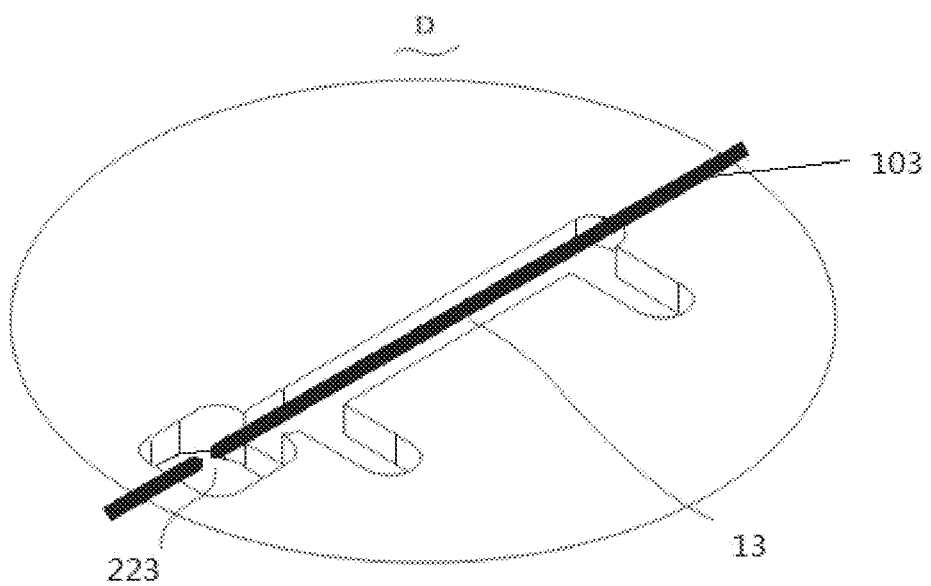
FIG. 37 illustrates an enlarged view of chamber in FIG. 36.

FIGS. 36 and 37 schematically illustrates another cartridge of another embodiment. The main differences between this embodiment and other embodiments are that: the cartridge further comprises at least one fluid stop region 223 to prevent filling of gap 207 by the fluidic medium; the cartridge comprises two sets of alignment unit 227 formed on two or three plates 10.

FIG. 36 shows another embodiment, three plates 10 are laminated together to form the main body of cartridge 100. The main body comprises multiple fluid entry port 108 and multiple fluid exit port 109. Inside the main body, cartridge 100 further comprises a plurality of light channels 102 and a plurality of fluidic channels 103. In this embodiment, there are five light channels 102, which are disposed along the widthwise direction of plate 10. Light channels 102 contain the respective light guides 101. Each light guide 101 is made of a material that is proper to carry light signal from its input to its output. An example of a light guide is an optical fiber line. There are five fluidic channels 103 disposed on the surface of one of the plates 10, each of which communicates between fluid entry port 108 and fluid exit port 109. Away from fluid entry port 108, each of fluidic channel 103 intersects with a respective light channel 102. Light channel 102 partly coincides with fluidic channels 103 to form chamber 104. Light guide 101 can be completely or partially contained by chamber 104. The shape of light channels 102 can be v-shape, circular shape, triangular shape or any other shape that is proper to carry light guide 101 in light channels 102. The shape of fluidic channels 103 can be v-shape, circular shape, triangular shape or any other shape that is proper to carry the fluid placed in it. Cartridge 100 further comprises at least one fluid stop region 223 to prevent filling of gap 207 by the fluidic medium; cartridge 100 comprises two sets of alignment unit formed on two or three plates 10.

FIG. 37 is an enlarged view of dashed circle D of FIG. 36. Fluid stop region 223 is placed into the side section of reaction space 13 where the gap 207 is located. Fluid stop region 223 has a deeper groove and a larger area compared to reaction space 13. Since the capillary force is significantly higher in the sections, where the spaces between surfaces are smaller; the fluid stop region 223 is made significantly large so that the fluid will not spread into the fluid stop region 223. It is important not to have fluid in gap 207 because if there is fluid in gap 207, the fluid would affect the signal passing through gap 207 and therefore the signal to noise ratio would be reduced. Especially if the fluid medium is blood then without fluid stop region 223 blood may occupy the space around gap 207 and as a result the signal to noise ratio will be reduced. In this embodiment, each of light guide 101 comprises fixed section 105 of light guide 101 and movable section 106 of light guide 101. Fixed section 105 of light guide 101 and movable section 106 of light guide 101 are separated by gap 207 and they are all contained in light guide 101. Gap 207 is less than approximately 10 micrometers (um). Light guide 101 is selected from materials of optical fiber, waveguide or light pipe, and is coated with magnetic material for magnetic actuation. When light guide 101 is made of materials like optical fiber and light pipe, it may be nickel coated, or any other suitable material, and the thickness of the coating can be about up to 5 micrometers and preferably between about 1 micrometer and about 2 micrometers.

The fluidic medium may comprise blood plasma, diluted blood, whole blood, finger prick, or venous blood.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

In a nutshell, the present disclosure proposes a cartridge (100), comprising: at least one fluidic channel (103), at least one light channel (102), at least one chamber (104) located at the intersection of the fluidic channel (103) and the light channel (102), at least one light guide (101) placed in the light channel (102); wherein the light guide (101) is at least partially contained in the respective chamber (104), wherein the light guide (101) has a movable section (106) and wherein vibration of the movable section (106) is externally actuatable.

In a further embodiment, the cartridge (100) comprises at least one light receiver (107), which receives light from the light guide (101);

In a further embodiment, vibration of the movable section (106) is actuatable by means of a vibration imparting means.

In a further embodiment, the cartridge (100) comprises a plurality of fluidic channels (103), a plurality of light channels (102), a plurality of chambers (104); wherein any one of the fluidic channel (103) of the plurality of fluidic channels (103) intersects with any one of the light channel (102) of the plurality of light channels (102); and wherein a chamber (104) of the plurality of chambers (104) is located at each intersection of any one of the fluidic channel (103) of the plurality of fluidic channels (103) and any one of the light channel (102) of the plurality of light channels (102).

In a further embodiment, a section of the light guide (101) is coated with a material to facilitate actuation.

In a further embodiment, the material to facilitate actuation is a magnetic material.

In a further embodiment, said vibration imparting means is an electromagnet (230) creating a force to actuate the movable section of the light guide (106).

In a further embodiment, the movable section (106) comprises an optical absorber.

In a further embodiment, the vibration imparting means is an intensity modulated light source (239) illuminating the optical absorber to facilitate actuation and actuates the movable section of the light guide (106).

In a further embodiment, the light receiver (107) receiving light from the light guide (101) is spaced from the same in a contactless configuration; wherein a gap (207) exists between the light receiver (107) and the light guide (101); and wherein one end of the light receiver (107) and one end of the light guide (101) are located substantially close to each other.

In a further embodiment, an optical axis of the light receiver (107) has a lateral offset with respect to an optical axis of the light guide (101) such that optical axis (202) of light receiver (107) is placed with vertical offset (208).

In a further embodiment, the light receiver (107) is an optical fiber.

In a further embodiment, the light receiver (107) contains a light collector, which is selected from a group consisting of waveguide, optical fiber or light pipe.

In a further embodiment, the light receiver (107) comprises an optical mask (213).

In a further embodiment, the light receiver (107) comprises an angled reflector (246) that changes the light direction.

In a further embodiment, the light guide (101) is selected from a group consisting of optical fiber, waveguide and light pipe.

In a further embodiment, one end of the light guide (101) has a hydrophobic coating.

In a further embodiment, one end of the light receiver (107) has a hydrophobic coating.

In a further embodiment, the tip of the light guide (101) is cleaved at an angle for sending light in the direction of an optical mask (213).

In a further embodiment, the light guide (101) is also the light receiver (107).

In a further embodiment on, the light guide (101) includes a bragg grating.

In a further embodiment, the chamber (104) consist of a fluid stop region (223) structurally with different dimensions than the chamber to prevent fluid from getting in between the light guide (101) and the light receiver (107).

In a further embodiment, the chamber (104) consists of a fluid stop region (223) with different surface coating to prevent fluid from getting in between the light guide (101) and the light receiver (107).

In a further embodiment, the cartridge (100) further comprises a light source (204) coupled with the light guide (101).

In a further embodiment, the cartridge (100) further comprises a photodetector (203) coupled with the light receiver (107).

In a further embodiment, the cartridge (100) further comprises a light source (204) coupled with the light guide (101) and also comprises a photodetector (203) coupled with the light receiver (107).

In a further embodiment, a first end of the light guide (101) is coupled with a beam splitter (243).

In a further embodiment, a photo detector (203) and a light source are coupled with the beam splitter (243).

In a further embodiment, an angled reflector (246) is coupled to a second end of the light guide (101) for providing a back reflection towards a first end of the light guide (101).

In a further embodiment, the light guide (101) is a multimode fiber.

In a further embodiment, vibration of the movable section (106) is externally actuatable.

In a further embodiment, vibration of the movable section (106) is actuatable by means of a vibration imparting means.

In a further embodiment, a section of the light guide is coated with a material to facilitate actuation in the form of a magnetic material.

In a further embodiment, the vibration imparting means is an electromagnet (230) coupled with the cartridge (100) to generate a force to actuate the light guide (101).

In a further embodiment, the movable section (106) comprises an optical absorber.

In a further embodiment, the vibration imparting means is a modulated light source (239) illuminating a material to facilitate actuation in the form of said optical absorber and actuates the movable section of the light guide (101).

In a further embodiment, the light guide (101) is selected from a group consisting of optical fiber, waveguide and light pipe.

In a further embodiment, one end of the light guide (101) has a hydrophobic coating.

In a further embodiment, the light guide (101) includes a bragg grating.

In a further embodiment, the chamber (104) consist of a fluid stop region (223) structurally with different dimensions than the chamber to prevent fluid from getting in between the light guide (101) and the angled reflector (246).

In a further embodiment, the chamber (104) consists of a fluid stop region (223) with different surface coating to prevent fluid from getting in between the light guide (101) and the angled reflector (246).

In a further embodiment, the light guide (101) is a tapered optical fiber.

In a further embodiment, the light channel (102) is v-shaped in cross section.

In a further embodiment, at least two plates (10) combine to form the cartridge (100), and the fluidic channel (103) is formed on one of the plates (10) or on two opposite plates (10).

In a further embodiment, when the fluidic channel (103) is formed on one of the plates, the fluidic channel (103) is triangular in cross-section; and wherein when the fluidic channel (103) is formed on two opposite of the plates, the fluidic channel (103) is square or rhombus in cross-section.

In a further embodiment, the cartridge (100) further comprises light source (204) coupled with the light guide (101).

In a further embodiment, the light source 204 and photo detector (203) are located outside of cartridge (100).

In a further embodiment, a sensing device for fluidic medium is proposed, comprising: a light source (204), a photo detector (203), an electromagnet (230) for generating a time-varying magnetic field, a processor (232) for processing the output of the photo detector (203) and creating a sensing signal in response to the physical property of the fluid medium and a cartridge (100), which is removably coupled to the sensing device.

In a further embodiment, the light source (204) is coupled to a light guide (101) of the cartridge (100) and the photo detector (203) is coupled to a light receiver (107) of the cartridge (100).

In a further embodiment, the magnetic field is capable of vibrating a movable section (106) of the light guide (101) of the cartridge (100).

LIST OF TERMS plate 10;
inlet 11;
outlet 12;
reaction space 13;
groove 14;
edge relief 161;
cartridge 100;
light guide 101;
light channel 102;
fluidic channel 103;
chamber 104;
fixed section 105;
movable section 106;
light receiver 107;
fluid entry port 108;
fluid exit port 109;

magnetic thin film 200;
optical axis of light guide 201;
optical axis of light receiver 202;
photo detector (PD) 203;
light source (LD) 204;
hydrophobic coated light guide section 205;
hydrophobic coated light receiver section 206;
gap 207;
vertical offset 208;
input fiber 210;
output fiber 211;
optical mask 213;
entrance of light guide 214;
exit of the light receiver 215;
input fiber core 216;
input fiber cladding 217;
output fiber core 218;
output fiber cladding 219;
lens 220;
fiber facet 221;
angle cleaved fiber 222;
fluid stop region 223;
hydrophobic coating 224;
hydrophilic coating 225;
narrow section of chamber 226;
wide section of chamber 226b;
alignment unit 227;
V groove of alignment unit 228;
cylindrical part 229;
electromagnet 230;
user interface 231;
processor 232;
electromagnet driver 233;
LD controller 234;
PD readout 235;
lock in amplifier 236;
power supply 237;
optical absorber 238;
modulated light source 239;
fiber bragg grating 241;
single mode fiber 242;
a beam splitter 243;
laser diode with a back facet photo-detector 244;
multimode fiber 245;
angled reflector 246;
optically transparent material 247;
heater 248; and
temperature controller 249.

The methods, devices, processing, circuitry, and logic described above for the sensing device may be implemented in many different ways and in many different combinations of hardware and software. For example, all or parts of the implementations may be circuitry that includes an instruction processing unit or processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

Various example embodiments have been described. These and other examples are within the scope of the following claims.

What is claimed is:

1. A cartridge comprising:
    a fluidic channel;
    a light channel;
    a chamber located at an intersection of the fluidic channel and the light channel;
    a light guide disposed in the light channel, wherein the light guide is at least partially positioned in the respective chamber so as to contact a fluid; and
    a light receiver positioned to receive light from the light guide;
    wherein the light guide includes a movable section;
    wherein the light guide and the light receiver are selected from the group consisting of a waveguide, an optical fiber and a light pipe; and
    wherein said chamber includes a fluid stop region to prevent said fluid from getting in between the light guide and the light receiver, and said movable section of said light guide is at least partially immersed in said fluid and is configured to vibrate, and a time-varying AC signal is generated by light power coupled from said light guide to said light receiver.

2. The cartridge according to claim 1 wherein the cartridge comprises a plurality of fluidic channels, a plurality of light channels, and a plurality of chambers; wherein a fluidic channel from among the plurality of fluidic channels intersects with a light channel from among the plurality of light channels; and wherein a chamber from among the plurality of chambers is located at an intersection of the fluidic channel and the light channel.

3. The cartridge according to claim 1 wherein a section of the light guide is coated with a magnetic material to facilitate electromagnetic actuation of the movable section.

4. The cartridge according to claim 1, wherein the movable section comprises an optical absorber.

5. The cartridge according to claim 4, wherein a vibration imparting actuator is provided in a form of an intensity modulated light source configured to illuminate the optical absorber to facilitate electromagnetic actuation and actuate the movable section of the light guide.

6. The cartridge according to claim 4, wherein the light receiver positioned to receive light from the light guide is spaced away from the light guide in a contactless configuration; wherein a gap exists between the light receiver and the light guide; and wherein one end of the light receiver and one end of the light guide are located substantially close to each other.

7. The cartridge according to claim 6, wherein an optical axis of the light receiver has a lateral offset with respect to an optical axis of the light guide.

8. The cartridge according to claim 1, wherein the light receiver contains a light collector, which is selected from a group consisting of a waveguide, an optical fiber or a light pipe.

9. The cartridge according to claim 1, wherein the light receiver comprises an optical mask.

10. The cartridge according to claim 1, wherein the light receiver comprises an angled reflector that changes a light direction.

11. The cartridge according to claim 1, wherein one end of the light guide includes a hydrophobic coating.

12. The cartridge according to claim 1, wherein one end of the light receiver includes a hydrophobic coating.

13. The cartridge according to claim 1, wherein a tip of the light guide is cleaved at an angle for sending light in a direction of an optical mask.

14. The cartridge according to claim 1, wherein the light guide is also the light receiver.

15. The cartridge according to claim 14, wherein the light guide includes a bragg grating.

16. The cartridge according to claim 1, wherein the fluid stop region includes structurally different dimensions than the chamber to prevent fluid from getting in between the light guide and the light receiver.

17. The cartridge according to claim 1, wherein the fluid stop region includes a different surface coating to prevent fluid from getting in between the light guide and the light receiver.

18. The cartridge according to claim 1, wherein the cartridge further comprises a photodetector coupled with the light receiver.

19. The cartridge according to claim 1, wherein the cartridge further comprises a light source coupled with the light guide and a photodetector coupled with the light receiver.

20. The cartridge according to claim 1, wherein a first end of the light guide is coupled with a beam splitter.

21. The cartridge according to claim 20, wherein a photo detector and a light source are coupled with the beam splitter.

22. The cartridge of claim 1, wherein an angled reflector is coupled to a second end of the light guide for providing a back reflection towards a first end of the light guide.

23. The cartridge according to claim 22, wherein the fluid stop region includes structurally different dimensions than the chamber to prevent fluid from getting in between the light guide and the light receiver.

24. The cartridge according to claim 23, wherein the fluid stop region includes a different surface coating to prevent fluid from getting in between the light guide and the light receiver.

25. The cartridge according to claim 1, wherein the light guide comprises a multimode fiber.

26. The cartridge according to claim 1, wherein vibration of the movable section is externally actuatable.

27. The cartridge according to claim 26, wherein vibration of the movable section is actuatable by means of a vibration imparting actuator.

28. The cartridge according to claim 27, wherein the movable section comprises a magnetic material arranged to facilitate electromagnetic actuation and the vibration imparting actuator is an electromagnet coupled with the cartridge to generate a force to actuate the moveable section of the light guide.

29. The cartridge according to claim 27, wherein the movable section comprises an optical absorber.

30. The cartridge according to claim 29, wherein the vibration imparting actuator is a modulated light source configured to illuminate a material to facilitate actuation in a form of said optical absorber and actuate the movable section of the light guide.

31. The cartridge according to claim 1, wherein the light guide includes a bragg grating.

32. The cartridge according to claim 1, wherein the light guide comprises a tapered optical fiber.

33. The cartridge according to claim 1, wherein the light channel is v-shaped in cross section.

34. The cartridge according to claim 1, wherein at least two plates combine to form the cartridge, and the fluidic channel is formed on one of the plates or on two opposite plates.

35. The cartridge according to claim 34, wherein when the fluidic channel is formed on one of the plates, the fluidic channel is triangular in cross-section; and wherein when the fluidic channel is formed on two opposite plates, the fluidic channel is square or rhombus in cross-section.

36. The cartridge according to claim 1, wherein a light source and a photo detector are located outside of the cartridge, the light source cooperatively operable with the light guide and the photo detector cooperatively operable with the light receiver.

37. The cartridge of claim 1, wherein the movable section comprises a magnetic material arranged to facilitate electromagnetic actuation.

38. A cartridge comprising:
a chamber at an intersection of a fluidic channel and a light channel included in the cartridge, the fluidic channel providing a flow path for fluid subject to measurement in the chamber;
a light guide disposed in the light channel and comprising a moveable section, the light guide being at least partially positioned in the chamber such that the moveable section contacts the fluid;
a light receiver, the light receiver positioned to receive light from the light guide, the moveable section of the light guide configured to vibrate such that a time-varying alternating current signal is generated by light power coupled from said light guide to said light receiver; and
a fluid stop region included in the chamber, the fluid stop region to prevent the fluid from getting in between the light guide and the light receiver.

39. A cartridge comprising:
a fluidic channel, the fluidic channel providing a flow path for fluid subject to measurement;
a light channel intersecting the fluidic channel;
a light guide disposed to at least partially coincide with the light channel such that a moveable section of the light guide is subject to contact with the fluid;
a light receiver, the light receiver positioned to receive light from the light guide,
the moveable section of the light guide configured to vibrate such that a time-varying alternating current signal is generated by light power coupled from said light guide to said light receiver; and
a fluid stop region to prevent the fluid from getting in between the light guide and the light receiver.

40. The cartridge of claim 39, wherein an optical axis of the moveable section is offset from an optical axis of the light receiver.

* * * * *